US012488735B2

(12) United States Patent
Kim et al.

(10) Patent No.: US 12,488,735 B2
(45) Date of Patent: Dec. 2, 2025

(54) PIXEL CIRCUIT AND DISPLAY DEVICE INCLUDING THE SAME

(71) Applicant: Samsung Display Co., Ltd., Yongin-Si (KR)

(72) Inventors: Yeonkyung Kim, Yongin-si (KR); Kwihyun Kim, Yongin-si (KR); Dongwoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 10 days.

(21) Appl. No.: 18/503,186

(22) Filed: Nov. 7, 2023

(65) Prior Publication Data

US 2024/0212584 A1 Jun. 27, 2024

(30) Foreign Application Priority Data

Dec. 21, 2022 (KR) ........................ 10-2022-0180809

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0852* (2013.01); *G09G 2300/0861* (2013.01); *G09G 2310/08* (2013.01)

(58) Field of Classification Search
CPC ... G09G 3/32–3291; G09G 2300/0852; G09G 2300/0861; G09G 2310/08
See application file for complete search history.

(56) References Cited

U.S. PATENT DOCUMENTS

| | | | | |
|---|---|---|---|---|
| 8,558,767 B2 * | 10/2013 | Kwon | G09G 3/3233 | 315/169.3 |
| 8,797,314 B2 | 8/2014 | Chung et al. | | |
| 8,902,134 B2 | 12/2014 | Yamashita et al. | | |
| 8,976,166 B2 * | 3/2015 | Han | G09G 3/3233 | 345/95 |
| 10,304,389 B2 | 5/2019 | Li | | |
| 2011/0193856 A1 * | 8/2011 | Han | G09G 3/3233 | 345/76 |
| 2015/0235595 A1 * | 8/2015 | Sugihara | G09G 3/3233 | 345/691 |

FOREIGN PATENT DOCUMENTS

| | | |
|---|---|---|
| CN | 106898304 B | 11/2018 |
| KR | 10-1058116 B1 | 8/2011 |
| KR | 10-1175299 B1 | 8/2012 |

* cited by examiner

*Primary Examiner* — Gene W Lee
(74) *Attorney, Agent, or Firm* — Innovation Counsel LLP

(57) ABSTRACT

A pixel circuit includes a light emitting element, a first transistor that applies a driving current to the light emitting element, a second transistor that writes a data voltage in response to a write gate signal, a first capacitor connected to a control electrode of the first transistor, a second capacitor including a first electrode connected to the second transistor and a second electrode connected to the control electrode of the first transistor, a third transistor that diode-connects the first transistor in response to a compensation gate signal, a fourth transistor that applies an initialization voltage to the control electrode of the first transistor in response to a first initialization gate signal, and a fifth transistor that transmits the driving current to the light emitting element in response to an emission signal.

21 Claims, 36 Drawing Sheets

PIXEL CIRCUIT AND DISPLAY DEVICE INCLUDING THE SAME

CROSS-REFERENCE TO RELATED APPLICATION

This application claims priority under 35 USC § 119 to Korean Patent Application No. 10-2022-0180809 filed on Dec. 21, 2022, in the Korean Intellectual Property Office (KIPO), the entire disclosure of which is incorporated herein by reference.

BACKGROUND

1. Field

Embodiments of the present disclosure relates to a pixel circuit and a display device including the pixel circuit.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

Recently, a display device configured to provide virtual reality (VR) or augmented reality (AR) is emerging. To this end, a reduced pixel size is required to increase pixel density, for example, pixels per inch (ppi), for the display device.

For the reduced pixel size and the increased pixel density (high ppi), components of the display device may be integrated into a narrow area as much as possible. However, there are limitations in integrating some components, which have minimum widths required to satisfy design rules in design, into a narrow area.

Accordingly, the necessity of minimizing a number of transistors constituting the pixels to integrate the transistors into a narrow area as many as possible is emerging.

SUMMARY

One object of the present disclosure is to provide a pixel circuit implemented with less transistors.

Another object of the present disclosure is to provide a display device including the pixel circuit.

However, the object of the present disclosure is not limited thereto. Thus, the object of the present disclosure may be extended without departing from the spirit and the scope of the present disclosure.

According to embodiments, a pixel circuit may include a light emitting element, a first transistor configured to apply a driving current to the light emitting element, a second transistor configured to write a data voltage in response to a write gate signal, a first capacitor connected to a control electrode of the first transistor, a second capacitor including a first electrode connected to the second transistor and a second electrode connected to the control electrode of the first transistor, a third transistor configured to diode-connect the first transistor in response to a compensation gate signal, a fourth transistor configured to apply an initialization voltage to the control electrode of the first transistor in response to a first initialization gate signal, and a fifth transistor configured to transmit the driving current to the light emitting element in response to an emission signal.

In an embodiment, the first transistor may include the control electrode connected to a first node, a first electrode configured to receive a first power supply voltage, and a second electrode connected to a second node.

In an embodiment, the first capacitor may include a first electrode configured to receive the first power supply voltage and a second electrode connected to the first node.

In an embodiment, the second transistor may include a control electrode configured to receive the write gate signal, a first electrode connected to a data line through which the data voltage is received, and a second electrode connected to the first electrode of the second capacitor.

In an embodiment, the second capacitor may include the first electrode connected to the second electrode of the second transistor and the second electrode connected to the first node.

In an embodiment, the third transistor may include a control electrode configured to receive the compensation gate signal, a first electrode connected to the second node, and a second electrode connected to the first node.

In an embodiment, the fourth transistor may include a control electrode configured to receive the first initialization gate signal, a first electrode configured to receive the initialization voltage, and a second electrode connected to the first node.

In an embodiment, the fifth transistor may include a control electrode configured to receive the emission signal, a first electrode connected to the second node, and a second electrode connected to a first electrode of the light emitting element.

In an embodiment, the light emitting element may include the first electrode connected to the second electrode of the fifth transistor and a second electrode configured to receive a second power supply voltage.

In an embodiment, the first to fifth transistors may be PMOS transistors.

In an embodiment, the write gate signal, the first initialization gate signal, the compensation gate signal, and the emission signal may have activation levels in an initialization period in which the first capacitor, the second capacitor, and the light emitting element are initialized.

In an embodiment, the write gate signal may have the activation level in a data write period in which the data voltage is written. In addition, the second transistor may be configured to apply a reference voltage to the first electrode of the second capacitor in the initialization period and to apply the data voltage to the first electrode of the second capacitor in the data write period.

In an embodiment, the write gate signal may have an activation level in a first initialization period in which the first electrode of the second capacitor is initialized. In addition, the first initialization gate signal and the compensation gate signal may have activation levels in a second initialization period in which the second electrode of the second capacitor and the first capacitor are initialized.

In an embodiment, the write gate signal may have the activation level in a data write period in which the data voltage is written. In addition, the second transistor may be configured to apply a reference voltage to the first electrode of the second capacitor in the first initialization period and to apply the data voltage to the first electrode of the second capacitor in the data write period.

In an embodiment, the first initialization gate signal, the compensation gate signal, and the emission signal may have inactivation levels in the first initialization period.

In an embodiment, the write gate signal and the emission signal may have inactivation levels in the second initialization period.

In an embodiment, the pixel circuit may further include a sixth transistor configured to connect the first electrode of the second capacitor to a ground in response to a second initialization gate signal.

In an embodiment, the sixth transistor may include a control electrode configured to receive the second initialization gate signal, a first electrode connected to the ground, and a second electrode connected to the first electrode of the second capacitor.

In an embodiment, the first initialization gate signal, the second initialization gate signal, the compensation gate signal, and the emission signal may have activation levels in an initialization period in which the first capacitor, the second capacitor, and the light emitting element are initialized.

In an embodiment, the pixel circuit may further include a sixth transistor configured to apply the initialization voltage to the first electrode of the second capacitor in response to a second initialization gate signal.

In an embodiment, the sixth transistor may include a control electrode configured to receive the second initialization gate signal, a first electrode configured to receive the initialization voltage, and a second electrode connected to the first electrode of the second capacitor.

In an embodiment, the pixel circuit may further include a sixth transistor configured to connect the first electrode of the second capacitor to a ground in response to the first initialization gate signal.

In an embodiment, the pixel circuit may further include a sixth transistor configured to apply the initialization voltage to the first electrode of the second capacitor in response to the first initialization gate signal.

According to embodiments, a display device may include a display panel including a pixel circuit, a data driver configured to apply a data voltage to the pixel circuit, a gate driver configured to apply a write gate signal, a compensation gate signal, and a first initialization gate signal to the pixel circuit, an emission driver configured to apply an emission signal to the pixel circuit, and a timing controller configured to control the data driver, the gate driver, and the emission driver. Here, the pixel circuit may include a light emitting element, a first transistor configured to apply a driving current to the light emitting element, a second transistor configured to write the data voltage in response to the write gate signal, a first capacitor connected to a control electrode of the first transistor, a second capacitor including a first electrode connected to the second transistor and a second electrode connected to the control electrode of the first transistor, a third transistor configured to diode-connect the first transistor in response to the compensation gate signal, a fourth transistor configured to apply an initialization voltage to the control electrode of the first transistor in response to the first initialization gate signal, and a fifth transistor configured to transmit the driving current to the light emitting element in response to the emission signal.

In an embodiment, the first transistor may include the control electrode connected to a first node, a first electrode configured to receive a first power supply voltage, and a second electrode connected to a second node.

In an embodiment, the first capacitor may include a first electrode configured to receive the first power supply voltage and a second electrode connected to the first node.

In an embodiment, the second transistor may include a control electrode configured to receive the write gate signal, a first electrode connected to a data line through which the data voltage is received, and a second electrode connected to the first electrode of the second capacitor.

In an embodiment, the second capacitor may include the first electrode connected to the second electrode of the second transistor and the second electrode connected to the first node.

In an embodiment, the third transistor may include a control electrode configured to receive the compensation gate signal, a first electrode connected to the second node, and a second electrode connected to the first node.

In an embodiment, the fourth transistor may include a control electrode configured to receive the first initialization gate signal, a first electrode configured to receive the initialization voltage, and a second electrode connected to the first node.

In an embodiment, the fifth transistor may include a control electrode configured to receive the emission signal, a first electrode connected to the second node, and a second electrode connected to a first electrode of the light emitting element.

In an embodiment, the light emitting element may include the first electrode connected to the second electrode of the fifth transistor and a second electrode configured to receive a second power supply voltage.

In an embodiment, the first to fifth transistors may be PMOS transistors.

In an embodiment, the pixel circuit may further include a sixth transistor configured to connect the first electrode of the second capacitor to a ground in response to a second initialization gate signal.

Therefore, a pixel circuit according to embodiments may be implemented with less transistors, so that a reduced pixel size and increased pixel density (high ppi) can be achieved.

However, the effects of the present disclosure are not limited thereto. Thus, the effects of the present disclosure may be extended without departing from the spirit and the scope of the present disclosure.

DETAILED DESCRIPTION OF THE EMBODIMENTS

Hereinafter, embodiments of the present disclosure will be explained in detail with reference to the accompanying drawings.

Figure 1:
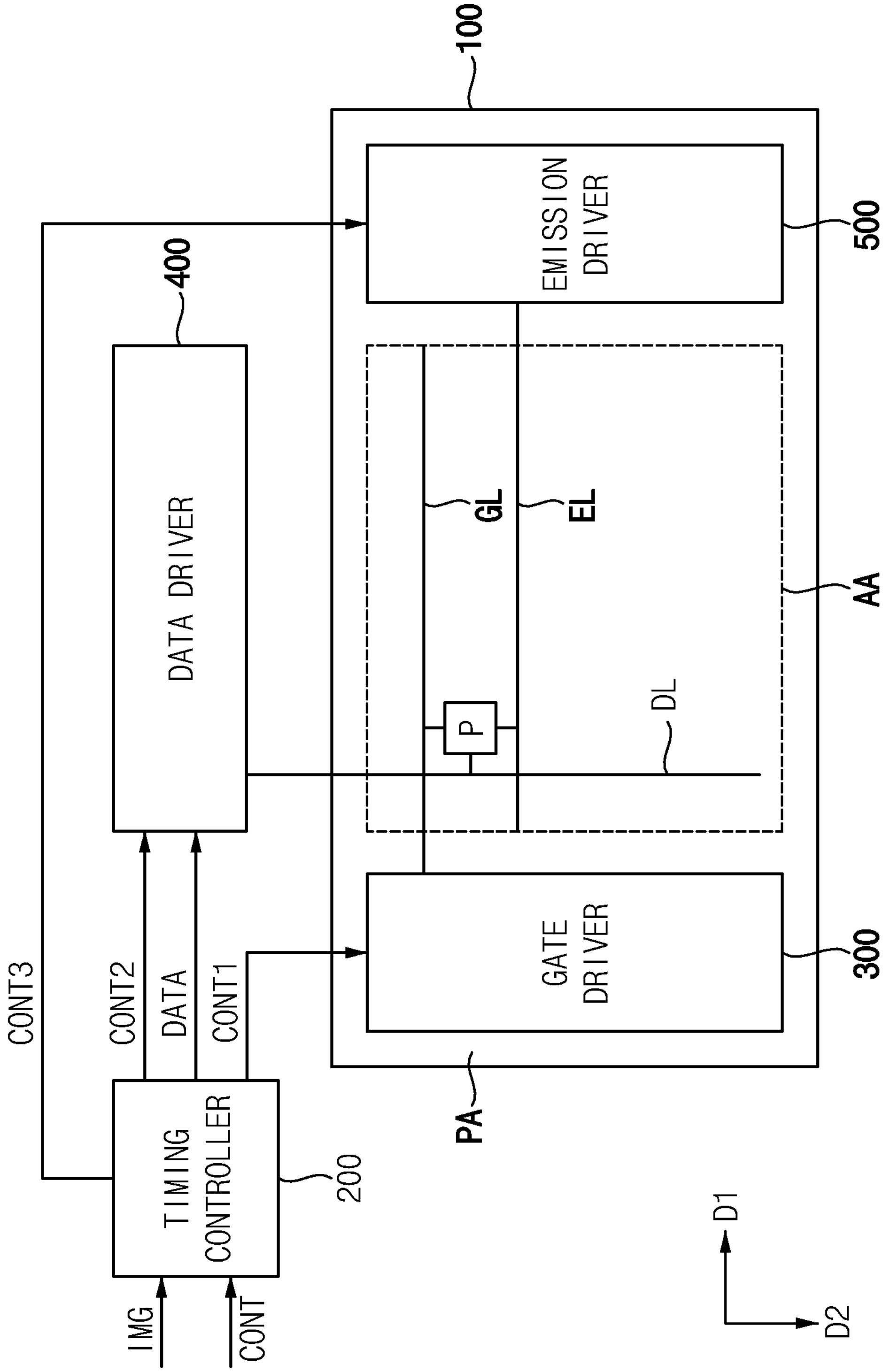
FIG. 1 is a block diagram showing a display device according to embodiments of the present disclosure.

FIG. 1 is a block diagram showing a display device according to embodiments of the present disclosure.

Referring to FIG. 1, a display device may include a display panel 100, a timing controller 200, a gate driver 300, a data driver 400, and an emission driver 500. According to one embodiment, the timing controller 200 and the data driver 400 may be integrated into a single chip.

The display panel 100 may include a display area AA configured to display an image, and a peripheral area PA that is adjacent to the display area AA. According to one embodiment, the gate driver 300 and the emission driver 500 may be mounted on the peripheral area PA.

The display panel 100 may include a plurality of gate lines GL, a plurality of data lines DL, a plurality of emission lines EL, and a plurality of pixel circuits P electrically connected to the gate lines GL, the data lines DL, and the emission lines EL. The gate lines GL and the emission lines EL may extend in a first direction D1, and the data lines DL may extend in a second direction D2 intersecting the first direction D1.

The timing controller 200 may receive input image data IMG and an input control signal CONT from a host processor (e.g., a graphic processing unit (GPU), etc.). For example, the input image data IMG may include red image data, green image data, and blue image data. According to one embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The timing controller 200 may generate the third control signal CONT3 for controlling an operation of the emission driver 500 based on the input control signal CONT to output the generated third control signal CONT3 to the emission driver 500. The third control signal CONT3 may include a vertical start signal and an emission clock signal.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages by converting the data signal DATA into an analog voltage. The data driver 400 may output the data voltages to the data lines DL.

The emission driver 500 may generate emission signals for driving the emission lines EL in response to the third control signal CONT3 received from the timing controller 200. The emission driver 500 may output the emission signals to the emission lines EL. For example, the emission driver 500 may sequentially output the emission signals to the emission lines EL.

Figure 2:
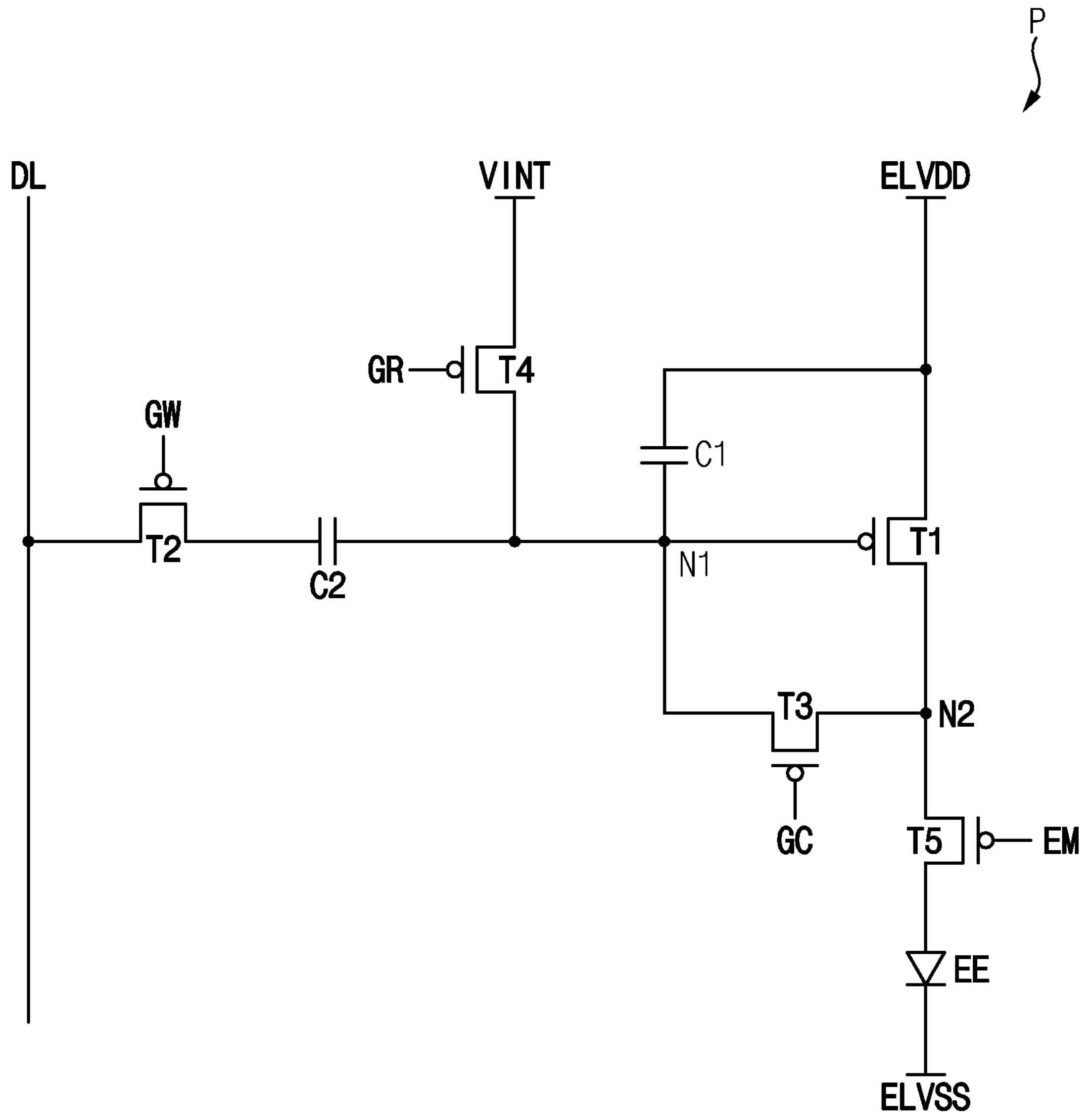
FIG. 2 is a circuit diagram showing one example of a pixel circuit of FIG. 1.
Figure 3:
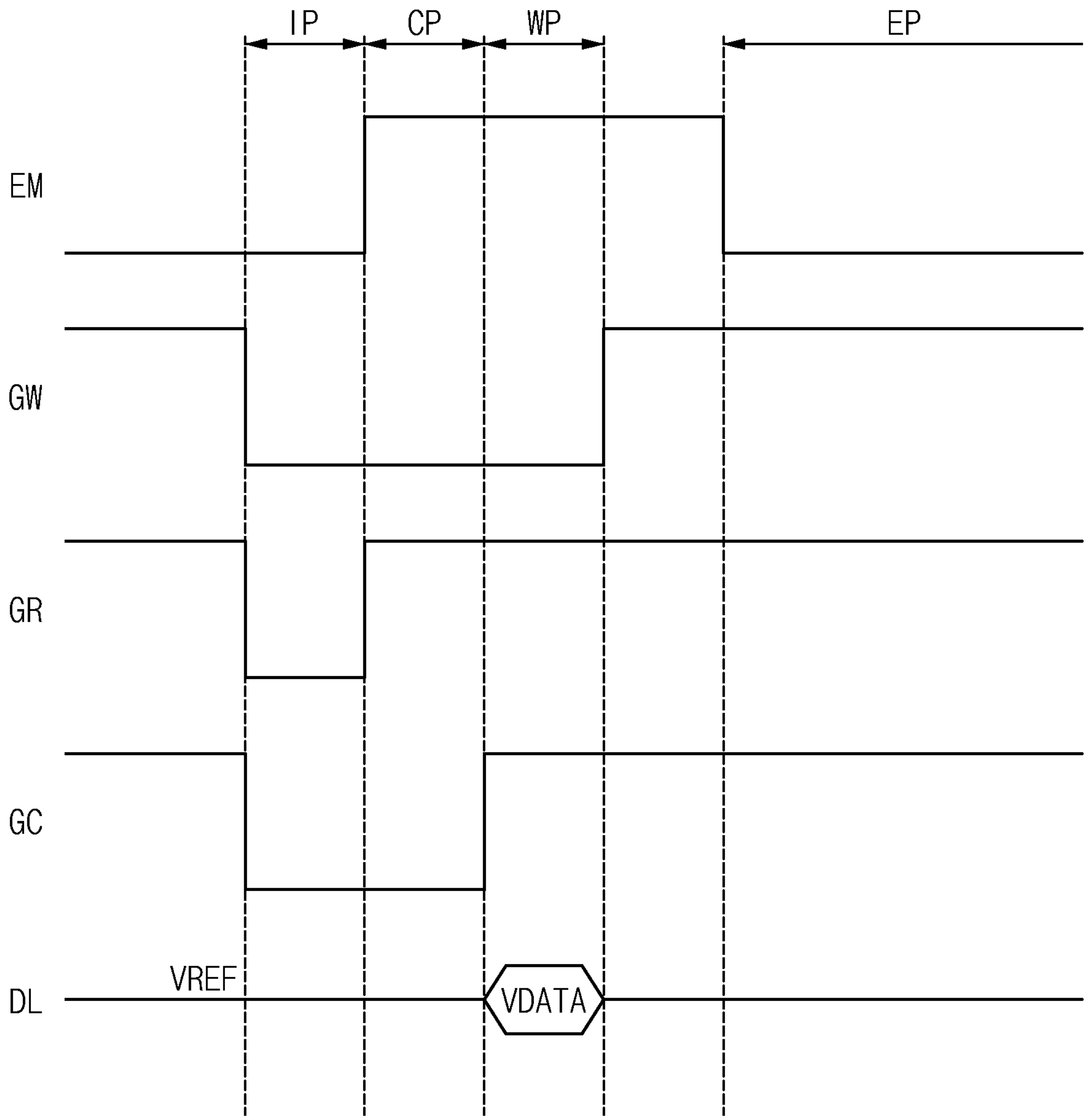
FIG. 3 is a timing diagram showing one example in which the pixel circuit of FIG. 1 is driven.

FIG. 2 is a circuit diagram showing one example of a pixel circuit P of FIG. 1, and FIG. 3 is a timing diagram showing one example in which the pixel circuit P of FIG. 1 is driven. As shown in FIG. 3, one frame period of the pixel circuit may include an initialization period IP, a compensation period CP, a data write period WP, and an emission period EP.

Referring to FIGS. 2 and 3, a pixel circuit P may include a light emitting element EE, a first transistor T1 configured to apply a driving current (ID of FIG. 7A) to the light emitting element EE, a second transistor T2 configured to write a data voltage VDATA in response to a write gate signal GW, a first capacitor C1 connected to a control electrode of the first transistor T1, a second capacitor C2 including a first electrode connected to the second transistor T2 and a second electrode connected to the control electrode of the first transistor T1, a third transistor T3 configured to diode-connect the first transistor T1 in response to a compensation gate signal GC, a fourth transistor T4 configured to apply an initialization voltage VINT to the control electrode of the first transistor T1 in response to a first initialization gate signal GR, and a fifth transistor T5 configured to transmit the driving current (ID of FIG. 7A) to the light emitting element EE in response to an emission signal EM.

For example, the first transistor T1 may include the control electrode connected to a first node N1, a first electrode connected to a first power supply voltage line to receive a first power supply voltage ELVDD (e.g., a high power supply voltage), and a second electrode connected to a second node N2. The first capacitor C1 may include a first electrode connected to the first power supply voltage line to receive the first power supply voltage ELVDD and a second electrode connected to the first node N1. The second transistor T2 may include a control electrode configured to receive the write gate signal GW, a first electrode connected to a data line DL through which the data voltage VDATA is received, and a second electrode connected to the first electrode of the second capacitor C2. The second capacitor C2 may include the first electrode connected to the second electrode of the second transistor T2 and the second electrode connected to the first node N1. The third transistor T3 may include a control electrode connected to a compensation gate signal line to receive the compensation gate signal GC, a first electrode connected to the second node N2, and a second electrode connected to the first node N1. The fourth transistor T4 may include a control electrode connected to a first initialization gate line to receive the first initialization gate signal GR, a first electrode connected to an initialization voltage line to receive the initialization voltage VINT, and a second electrode connected to the first node N1. The fifth transistor T5 may include a control electrode connected to an emission signal line to receive the emission signal EM, a first electrode connected to the second node N2, and a second electrode connected to a first electrode of the light emitting element EE. The light emitting element EE may include the first electrode connected to the second electrode of the fifth transistor T5, and a second electrode connected to a second power supply voltage line to receive a second power supply voltage ELVSS (e.g., a low power supply voltage).

The first to fifth transistors T1, T2, T3, T4, and T5 may be implemented as p-channel metal oxide semiconductor (PMOS) transistors. In this case, a low voltage level may be an activation level, and a high voltage level may be an inactivation level. For example, when a signal applied to a control electrode of a PMOS transistor has a low voltage level, the PMOS transistor may be turned on. For example, when a signal applied to the control electrode of the PMOS transistor has a high voltage level, the PMOS transistor may be turned off.

However, the present disclosure is not limited thereto. For example, the first to fifth transistors T1, T2, T3, T4, and T5 may be implemented as n-channel metal oxide semiconductor (NMOS) transistors. For example, at least one of the first to fifth transistors T1, T2, T3, T4, and T5 may be implemented as an n-channel metal oxide semiconductor (NMOS) transistor and others may be implemented as p-channel metal oxide semiconductor (PMOS) transistors.

Figure 4A:
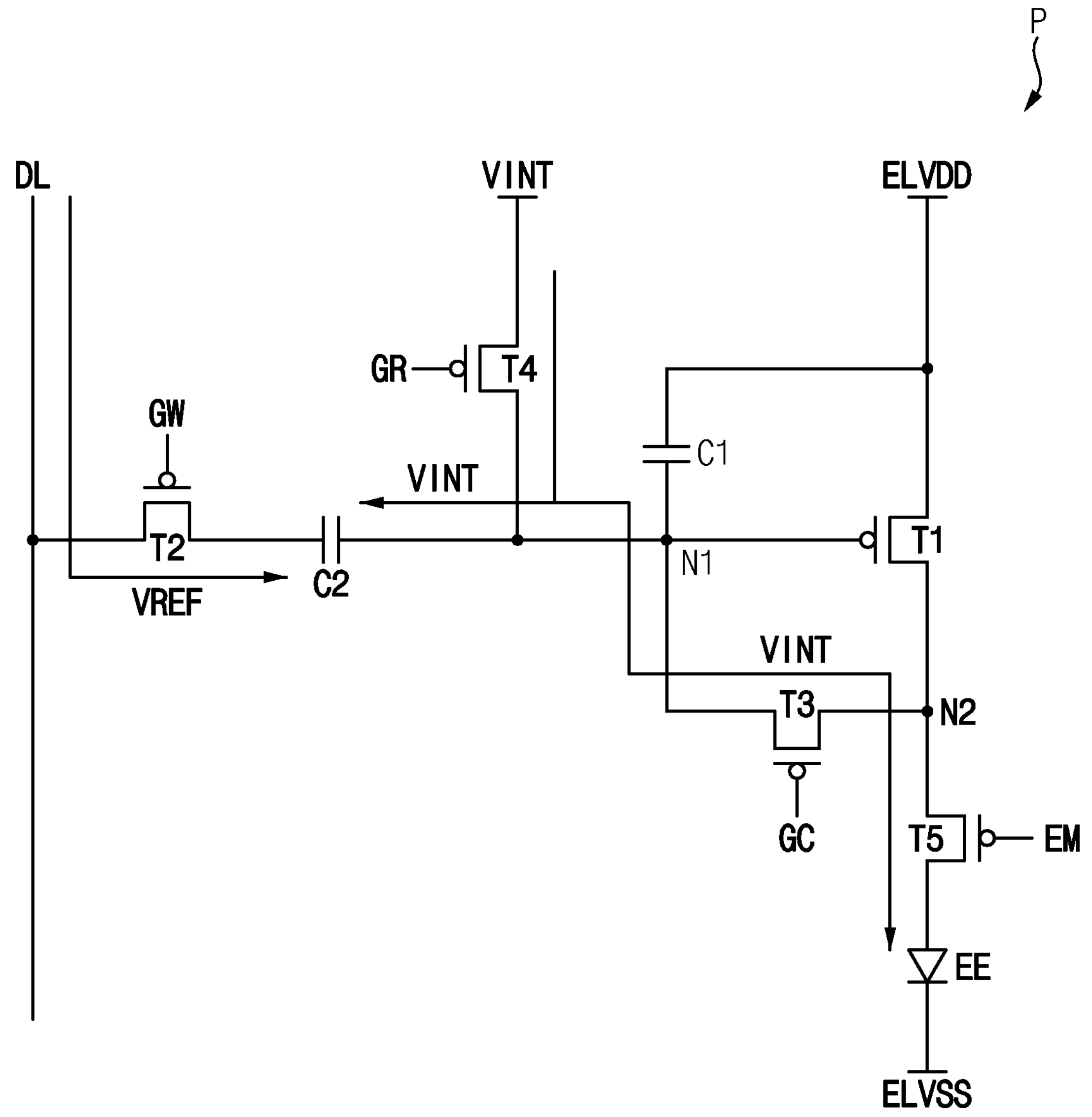
FIGS. 4A and 4B are views showing one example in which the pixel circuit of FIG. 1 is driven in an initialization period.
Figure 4B:
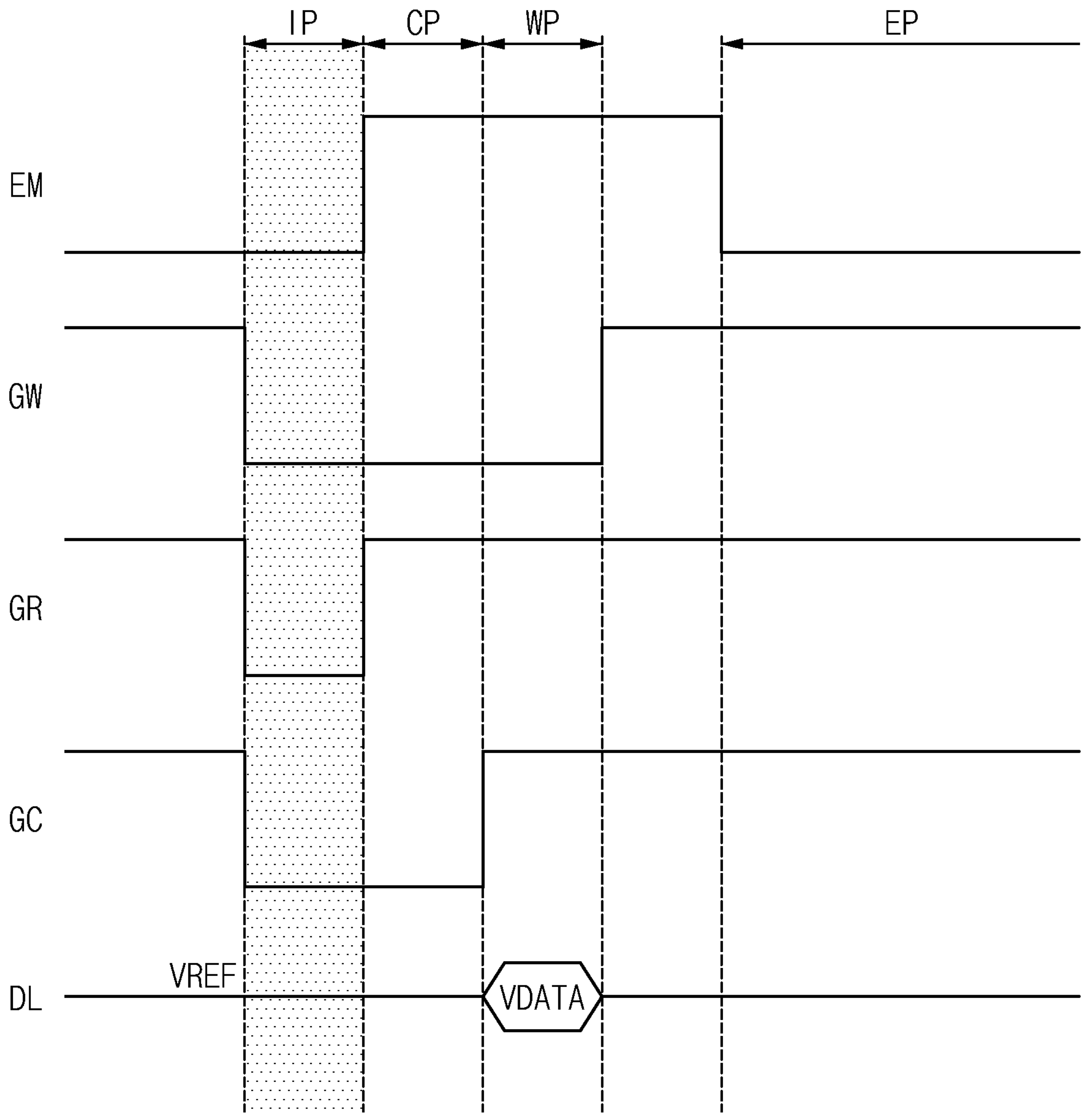

FIGS. 4A and 4B are views showing one example in which the pixel circuit P of FIG. 1 is driven in the initialization period IP.

Referring to FIGS. 4A and 4B, the write gate signal GW, the first initialization gate signal GR, the compensation gate signal GC, and the emission signal EM may have activation levels in the initialization period IP in which the first capacitor C1, the second capacitor C2, and the light emitting element EE are initialized. The second transistor T2 may apply a reference voltage VREF to the first electrode of the second capacitor C2 in the initialization period IP.

For example, in the initialization period IP, the write gate signal GW, the first initialization gate signal GR, the compensation gate signal GC, and the emission signal EM may have the activation levels, and the second to fifth transistors T2, T3, T4, and T5 may be turned on. Accordingly, the reference voltage VREF may be applied to the first electrode of the second capacitor C2, and the initialization voltage VINT may be applied to the second electrode of the second capacitor, the second electrode of the first capacitor, and the first electrode of the light emitting element EE. In other words, the first capacitor C1, the second capacitor C2, and the light emitting element EE may be initialized during the initialization period IP.

Figure 5A:
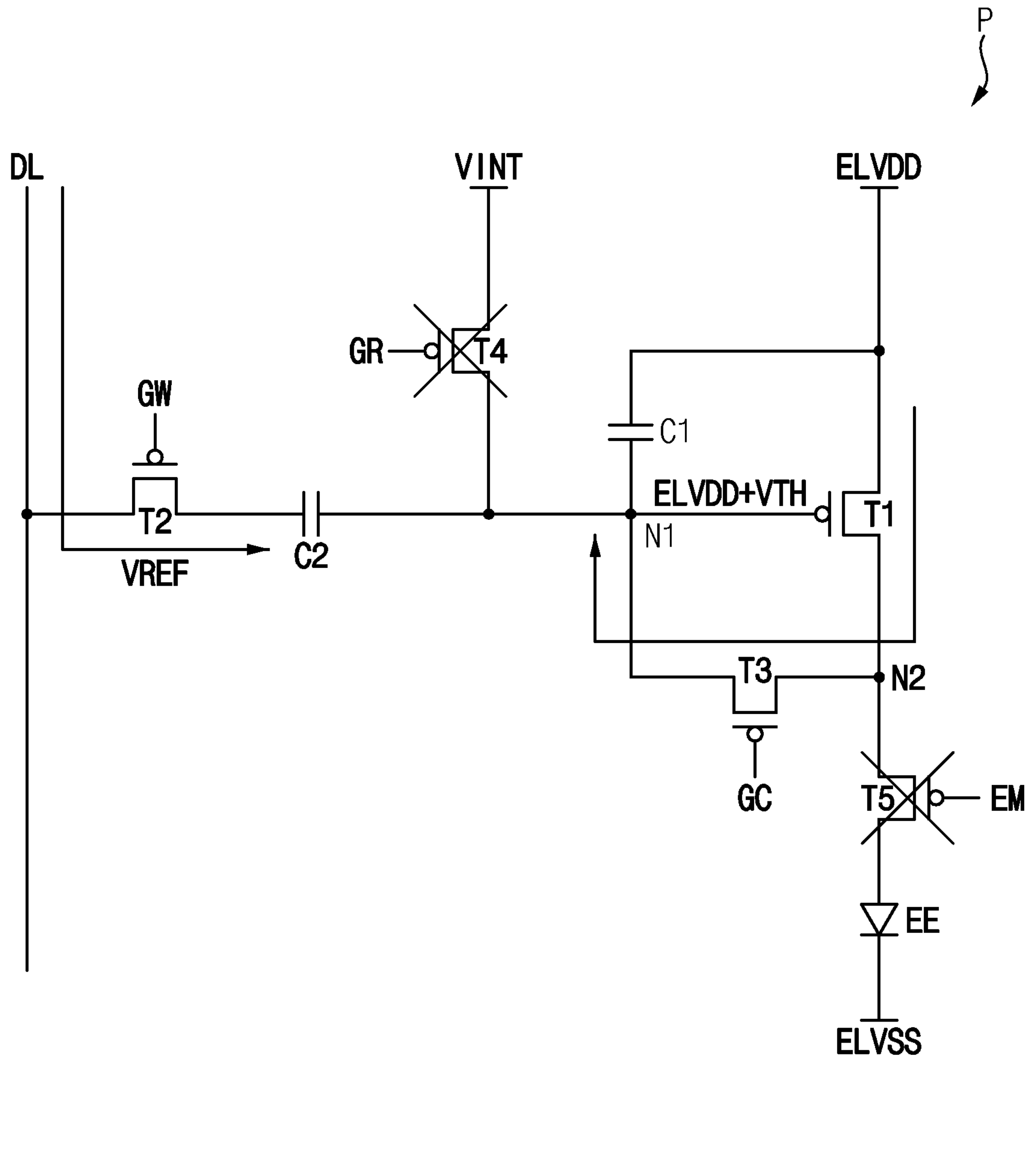
FIGS. 5A and 5B are views showing one example in which the pixel circuit of FIG. 1 is driven in a compensation period.
Figure 5B:
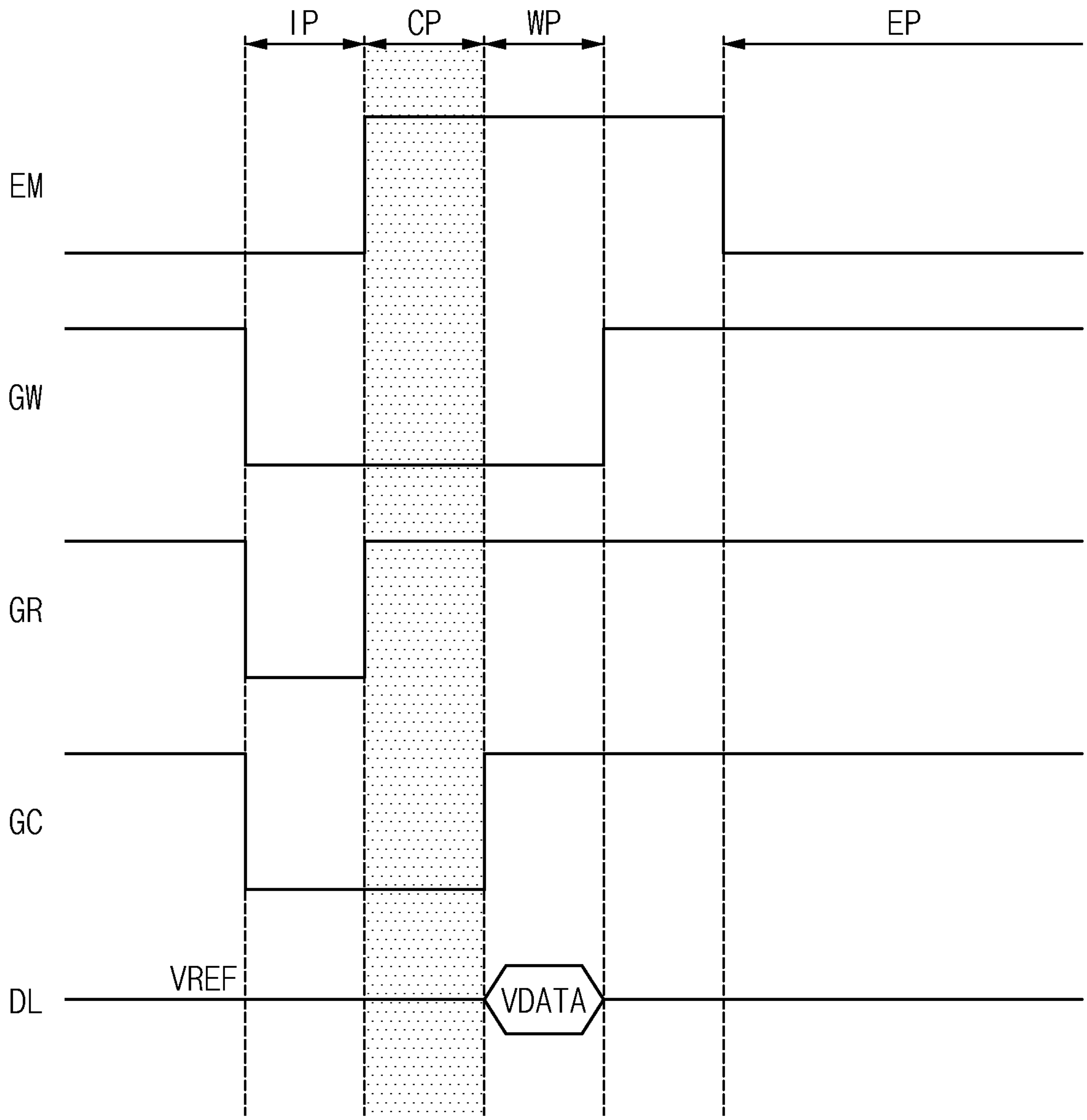

FIGS. 5A and 5B are views showing one example in which the pixel circuit P of FIG. 1 is driven in a compensation period CP.

Referring to FIGS. 5A and 5B, the write gate signal GW and the compensation gate signal GC may have the activation levels in a compensation period CP during which a threshold voltage VTH of the first transistor T1 is compensated. The second transistor T2 may apply the reference voltage VREF to the first electrode of the second capacitor C2 in the compensation period CP. The first initialization gate signal GR and the emission signal EM may have inactivation levels in the compensation period CP.

For example, in the compensation period CP, the write gate signal GW and the compensation gate signal GC may have the activation levels, the first initialization gate signal GR and the emission signal EM may have the inactivation levels in the compensation period CP, and the second transistor T2 and the third transistor T3 may be turned on. Accordingly, the reference voltage VREF may be applied to the first electrode of the second capacitor C2, and the first power supply voltage compensated for the threshold voltage VTH (i.e., ELVDD+VTH) may be applied to the first node N1.

Figure 6A:
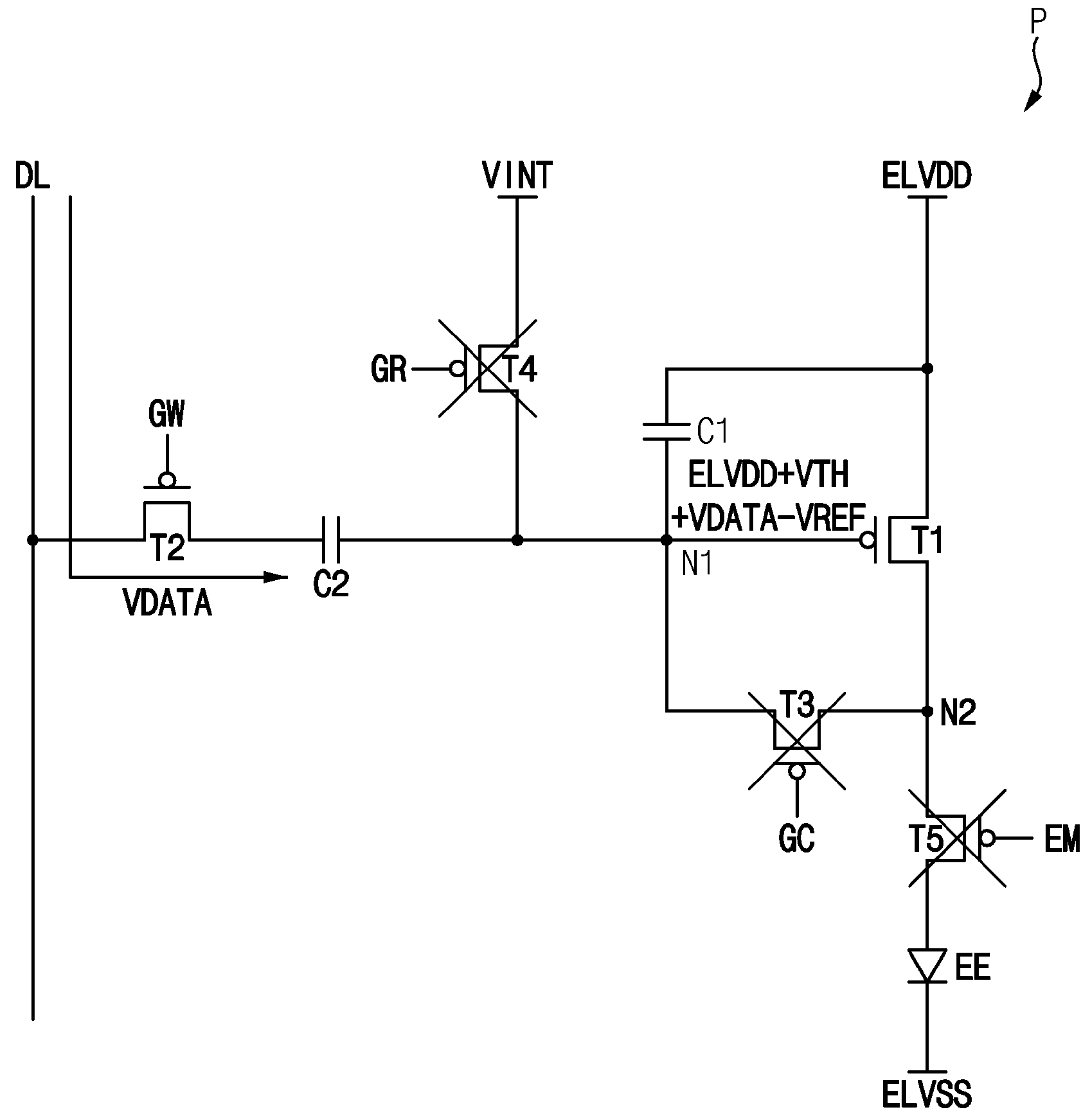
FIGS. 6A and 6B are views showing one example in which the pixel circuit of FIG. 1 is driven in a data write period.
Figure 6B:
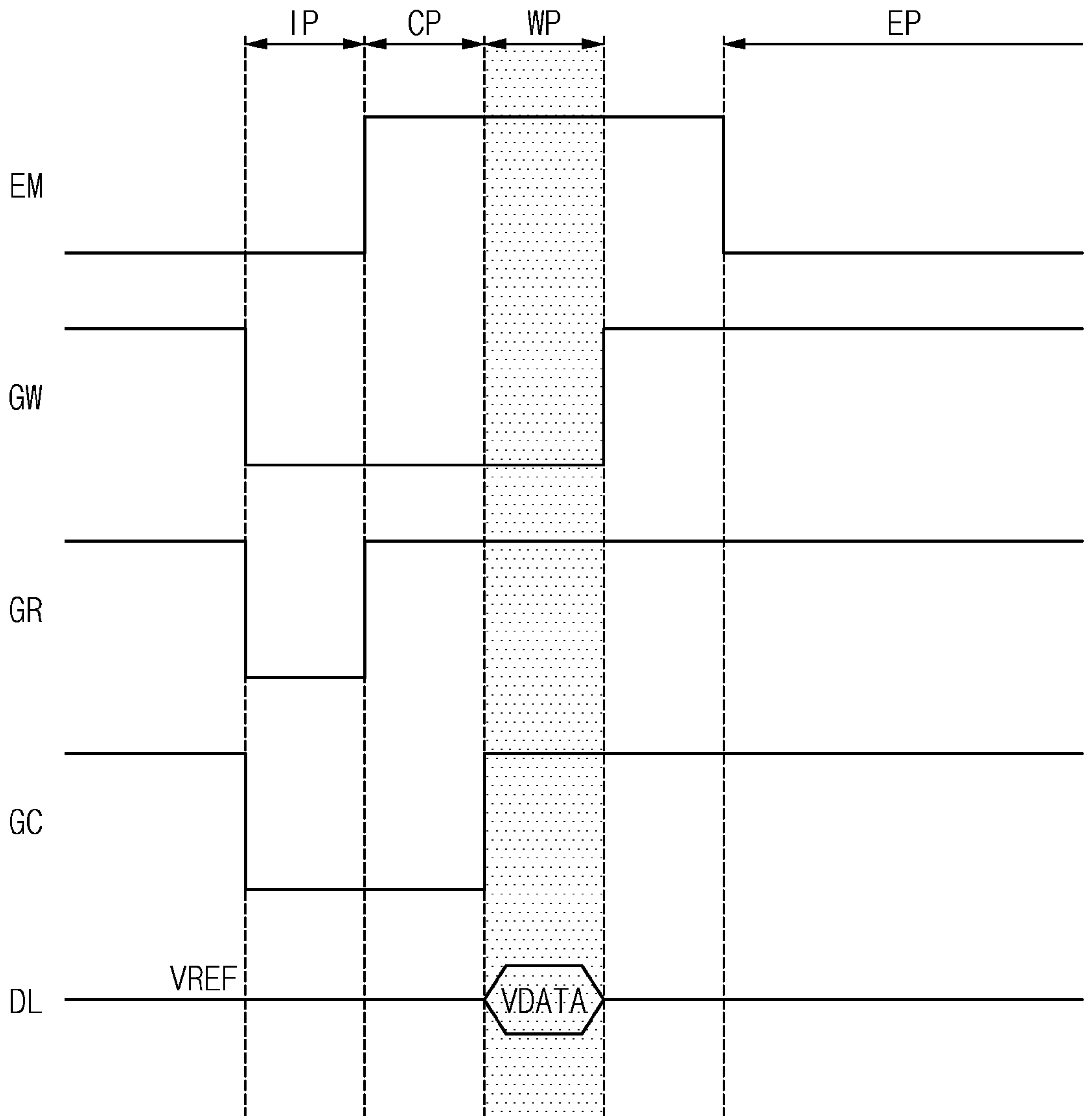

FIGS. 6A and 6B are views showing one example in which the pixel circuit P of FIG. 1 is driven in a data write period WP.

Referring to FIGS. 6A and 6B, the write gate signal GW may have the activation level during a data write period WP in which the data voltage VDATA is written. The second transistor T2 may apply the data voltage VDATA to the first electrode of the second capacitor C2 in the data write period WP. The first initialization gate signal GR, the compensation gate signal GC, and the emission signal EM may have inactivation levels in the data write period WP.

For example, in the data write period WP, the write gate signal GW may have the activation level, the first initialization gate signal GR, the compensation gate signal GC, and the emission signal EM may have the inactivation levels, and the second transistor T2 may be turned on.

Accordingly, the data voltage VDATA may be applied to the first electrode of the second capacitor C2, and a voltage of the second electrode of the second capacitor C2 (i.e., a voltage of the first node N1) may be increased by a difference between the data voltage VDATA and the reference voltage VREF.

Figure 7A:
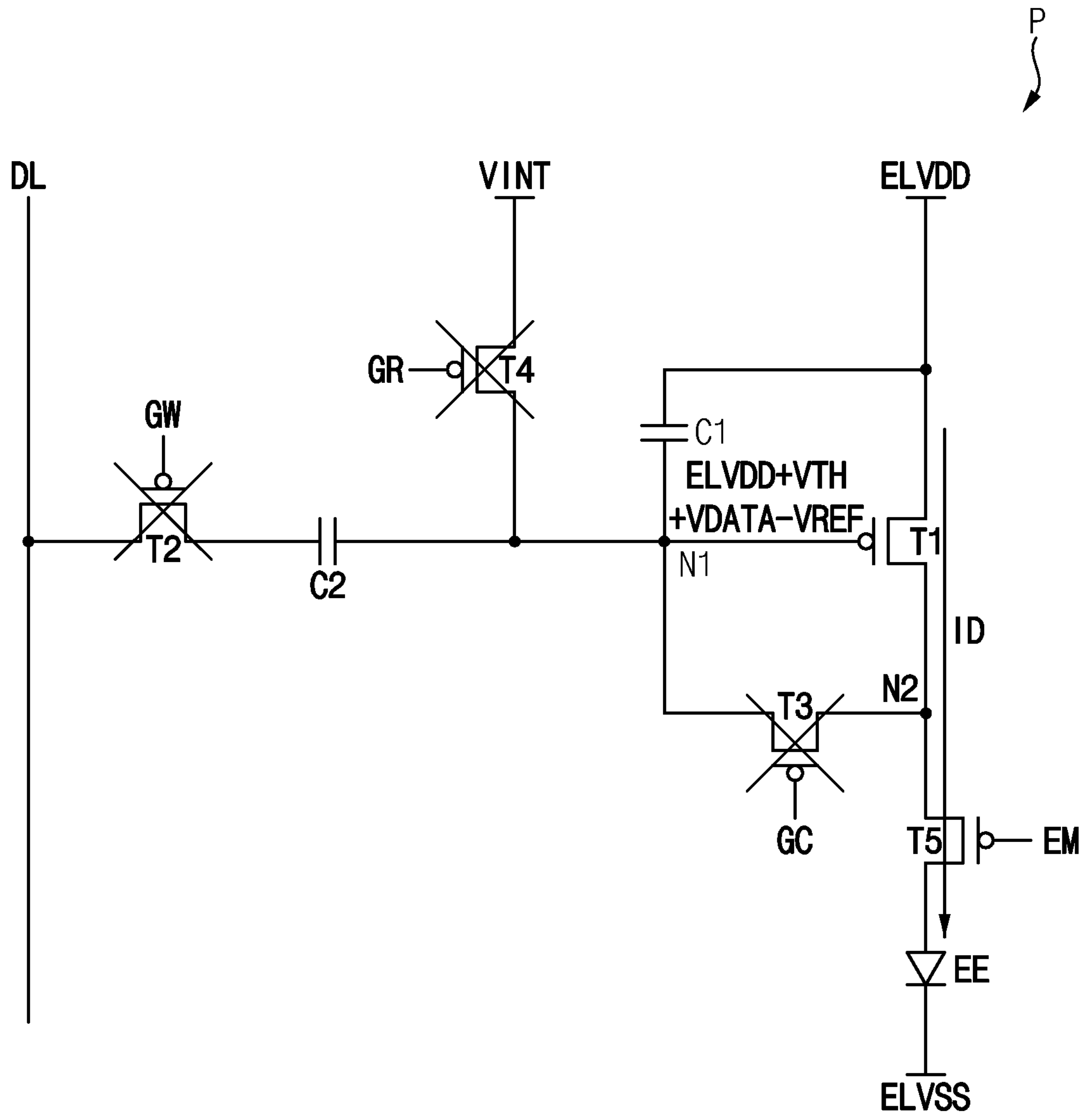
FIGS. 7A and 7B are views showing one example in which the pixel circuit of FIG. 1 is driven in an emission period.
Figure 7B:
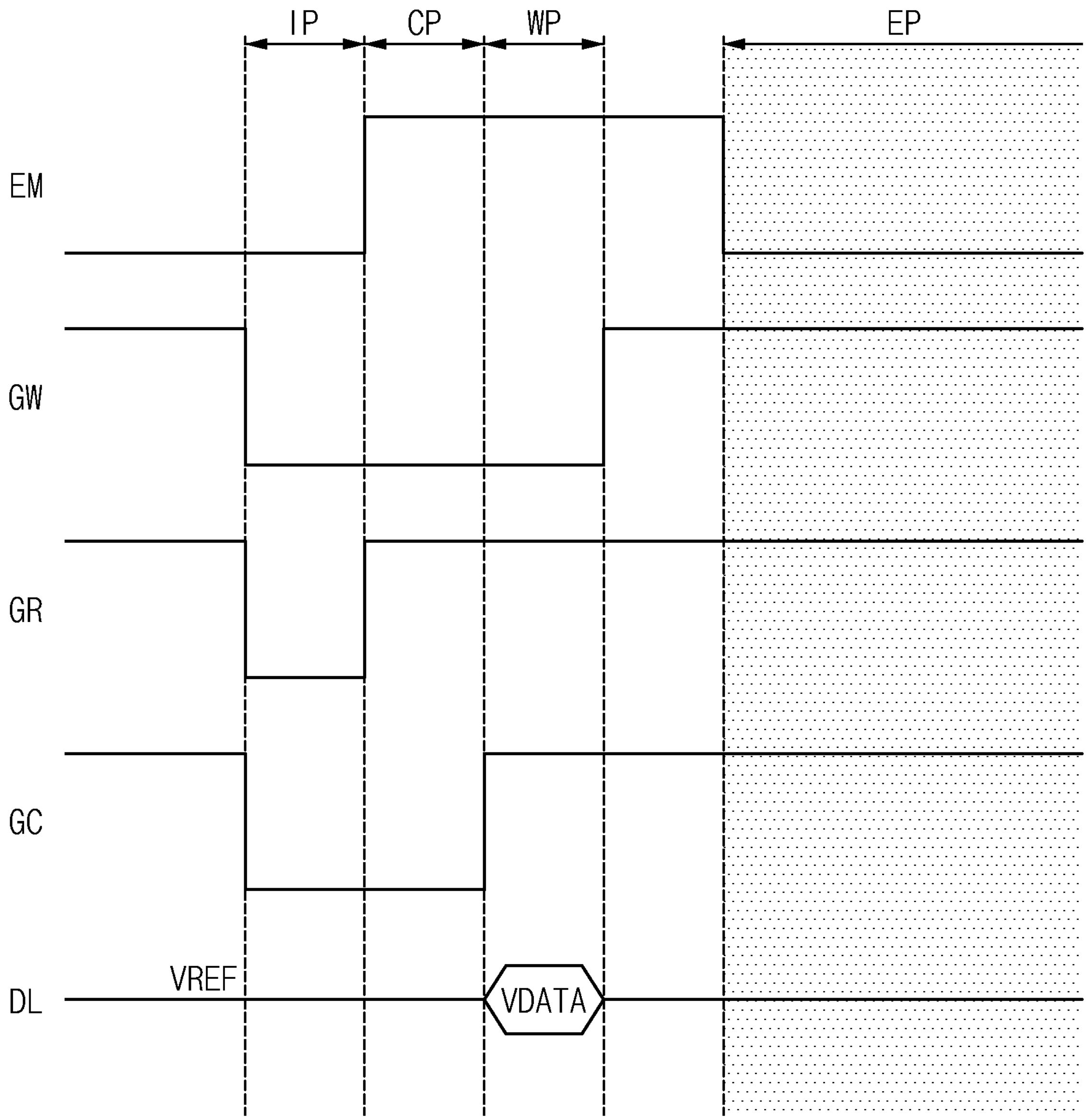

FIGS. 7A and 7B are views showing one example in which the pixel circuit P of FIG. 1 is driven in an emission period EP.

Referring to FIGS. 7A and 7B, the emission signal EM may have the activation level in an emission period EP in which a light is emitted. The write gate signal GW, the first initialization gate signal GR, and the compensation gate signal GC may have inactivation levels in the emission period EP.

For example, in the emission period EP, the emission signal EM may have the activation level, the write gate signal GW, the first initialization gate signal GR, and the compensation gate signal GC may have the inactivation levels, and the fifth transistor T5 may be turned on. Accordingly, a driving current ID corresponding to the voltage of the first node N1 may be generated, and the driving current ID may be applied to the light emitting element EE. In other words, the light emitting element EE may emit a light with a luminance corresponding to the driving current ID.

Figure 8:
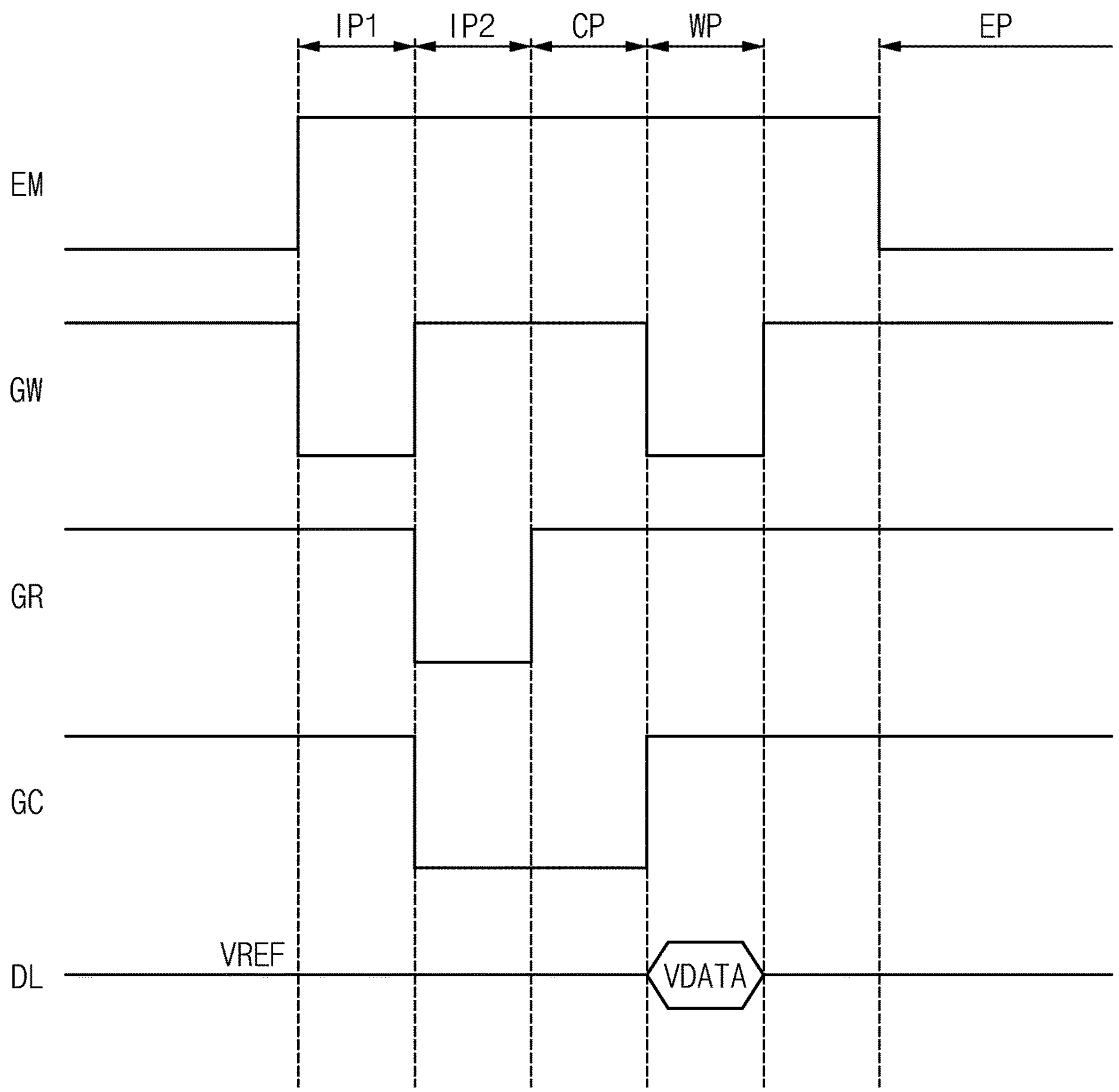
FIG. 8 is a timing diagram showing one example in which a pixel circuit of a display device according to embodiments of the present disclosure is driven.
Figure 9A:
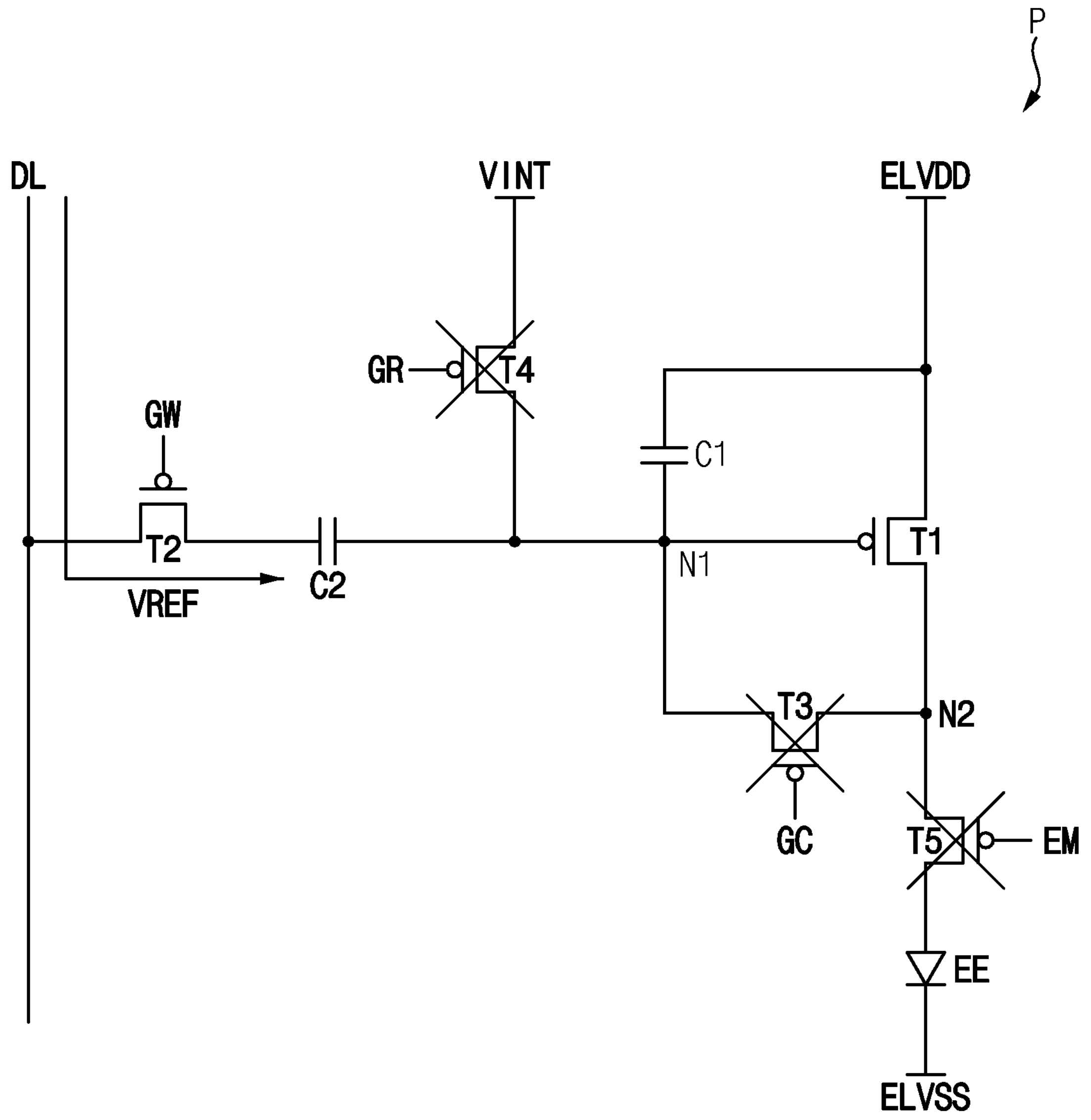
FIGS. 9A and 9B are views showing one example in which the pixel circuit of the display device of FIG. 8 is driven in a first initialization period.
Figure 9B:
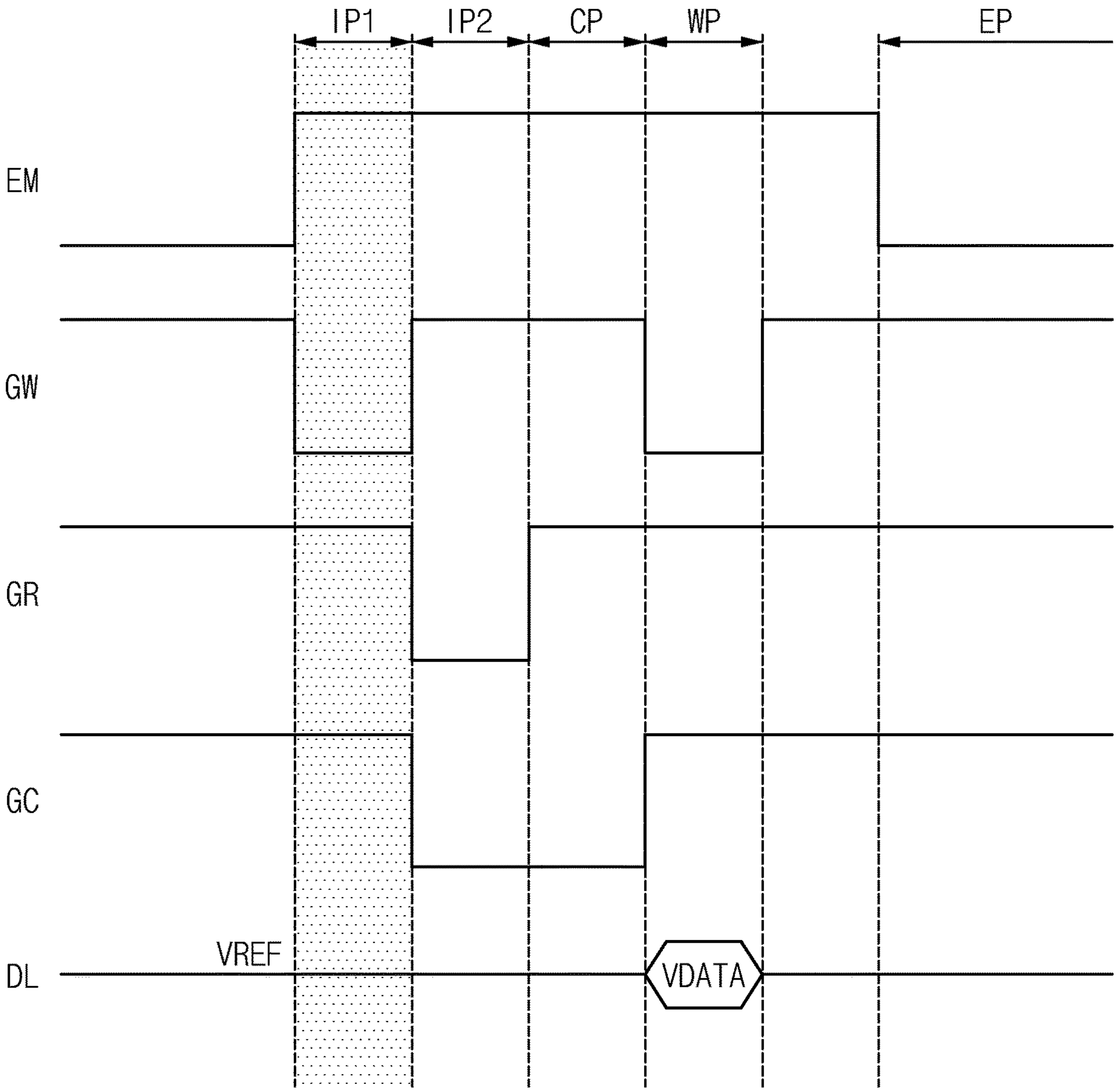

FIG. 8 is a timing diagram showing one example in which a pixel circuit P of a display device according to embodiments of the present disclosure is driven, and FIGS. 9A and 9B are views showing one example in which the pixel circuit P of the display device of FIG. 8 is driven in a first initialization period IP1.

Since a display device according to the present embodiments has a configuration that is substantially identical to the configuration of the display device of FIG. 1 except for the timing of the gate signals GW, GR, and GC and the emission signal EM, the same reference numerals and reference signs will be used for the same or similar components, and redundant descriptions will be omitted.

Referring to FIGS. 8, 9A, and 9B, the write gate signal GW may have an activation level in a first initialization period IP1 in which the first electrode of the second capacitor C2 is initialized. The second transistor T2 may apply a reference voltage VREF to the first electrode of the second capacitor C2 in the first initialization period IP1. The first initialization gate signal GR, the compensation gate signal GC, and the emission signal EM may have inactivation levels in the first initialization period IP1.

For example, in the first initialization period IP1, the write gate signal GW may have the activation level, the first initialization gate signal GR, the compensation gate signal GC, and the emission signal EM may have the inactivation levels, and the second transistor T2 may be turned on. Accordingly, the reference voltage VREF may be applied to the first electrode of the second capacitor C2. In other words, the first electrode of the second capacitor C2 may be initialized.

Figure 10A:
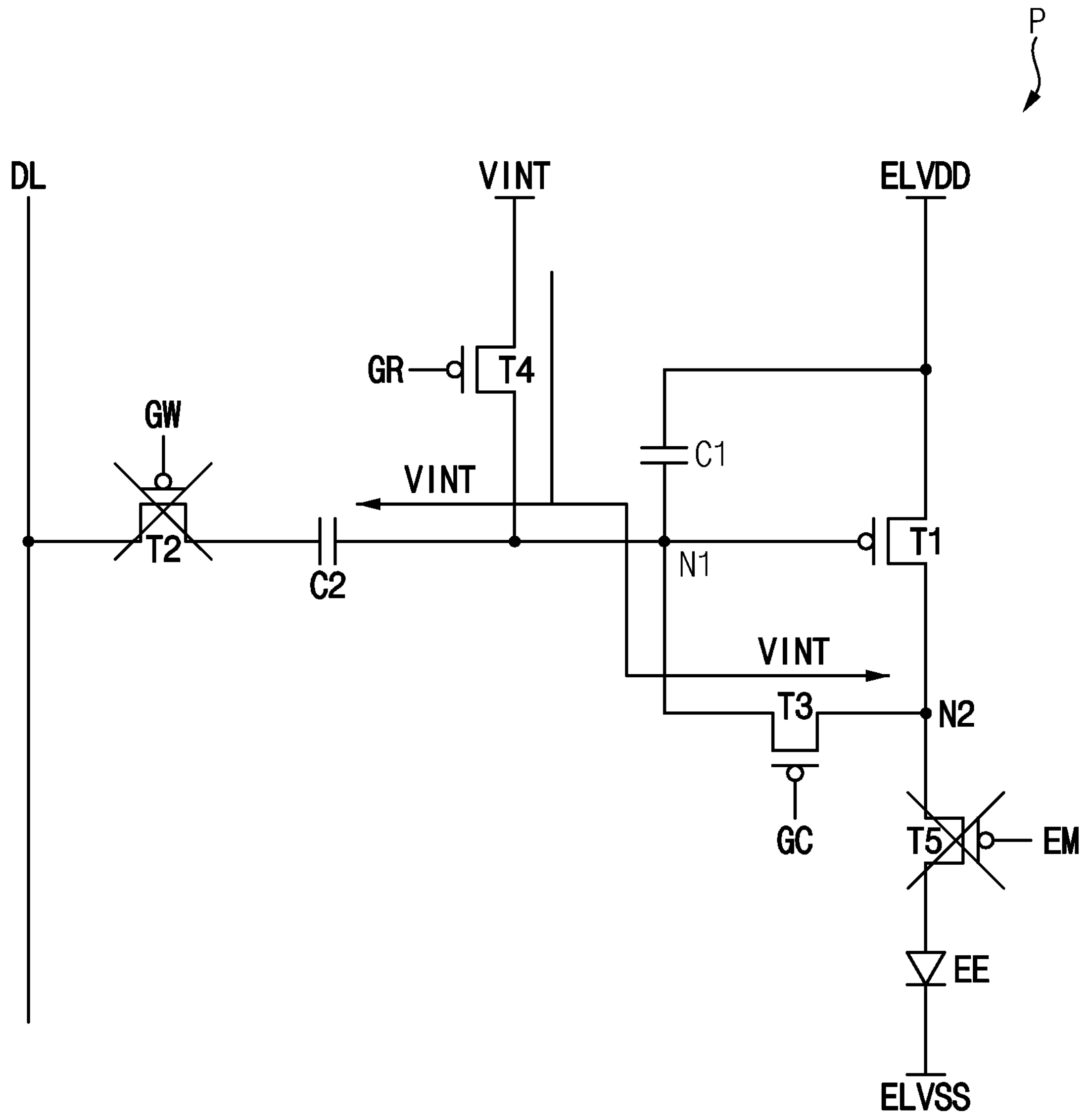
FIGS. 10A and 10B are views showing one example in which the pixel circuit of the display device of FIG. 8 is driven in a second initialization period.
Figure 10B:
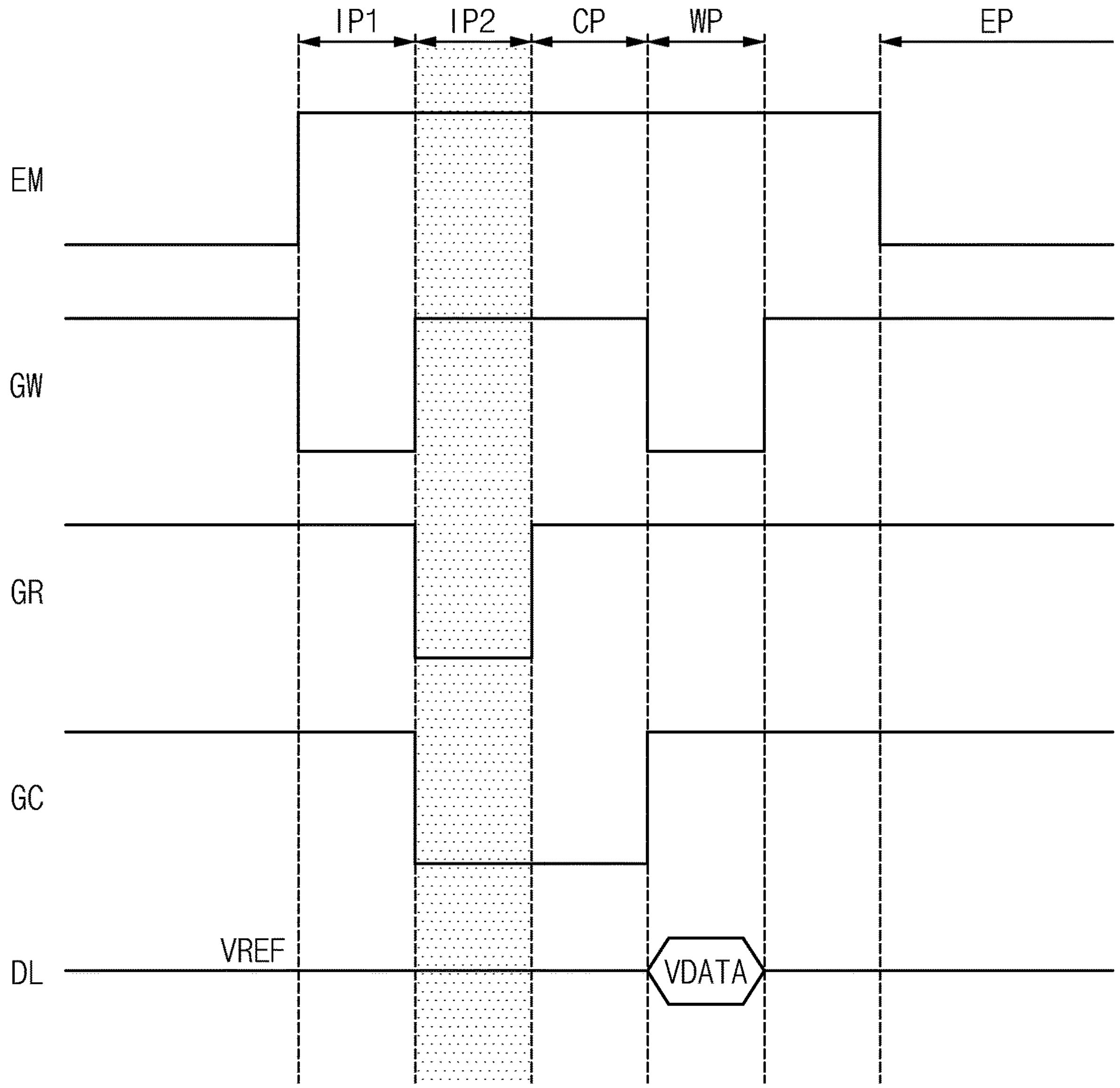

FIGS. 10A and 10B are views showing one example in which the pixel circuit P of the display device of FIG. 8 is driven in a second initialization period IP2.

Referring to FIGS. 10A and 10B, the first initialization gate signal GR and the compensation gate signal GC may have activation levels in a second initialization period IP2 in which the second electrode of the second capacitor C2 and the first capacitor C1 are initialized. The write gate signal GW and the emission signal EM may have inactivation levels in the second initialization period IP2.

For example, in the second initialization period IP2, the first initialization gate signal GR and the compensation gate signal GC may have the activation levels, the write gate signal GW and the emission signal EM may have the inactivation levels, and the third and fourth transistors T3 and T4 may be turned on. Accordingly, the initialization voltage VINT may be applied to the second electrode of the second capacitor and the second electrode of the first capacitor. In other words, the first capacitor C1 and the second electrode of the second capacitor C2 may be initialized.

Figure 11A:
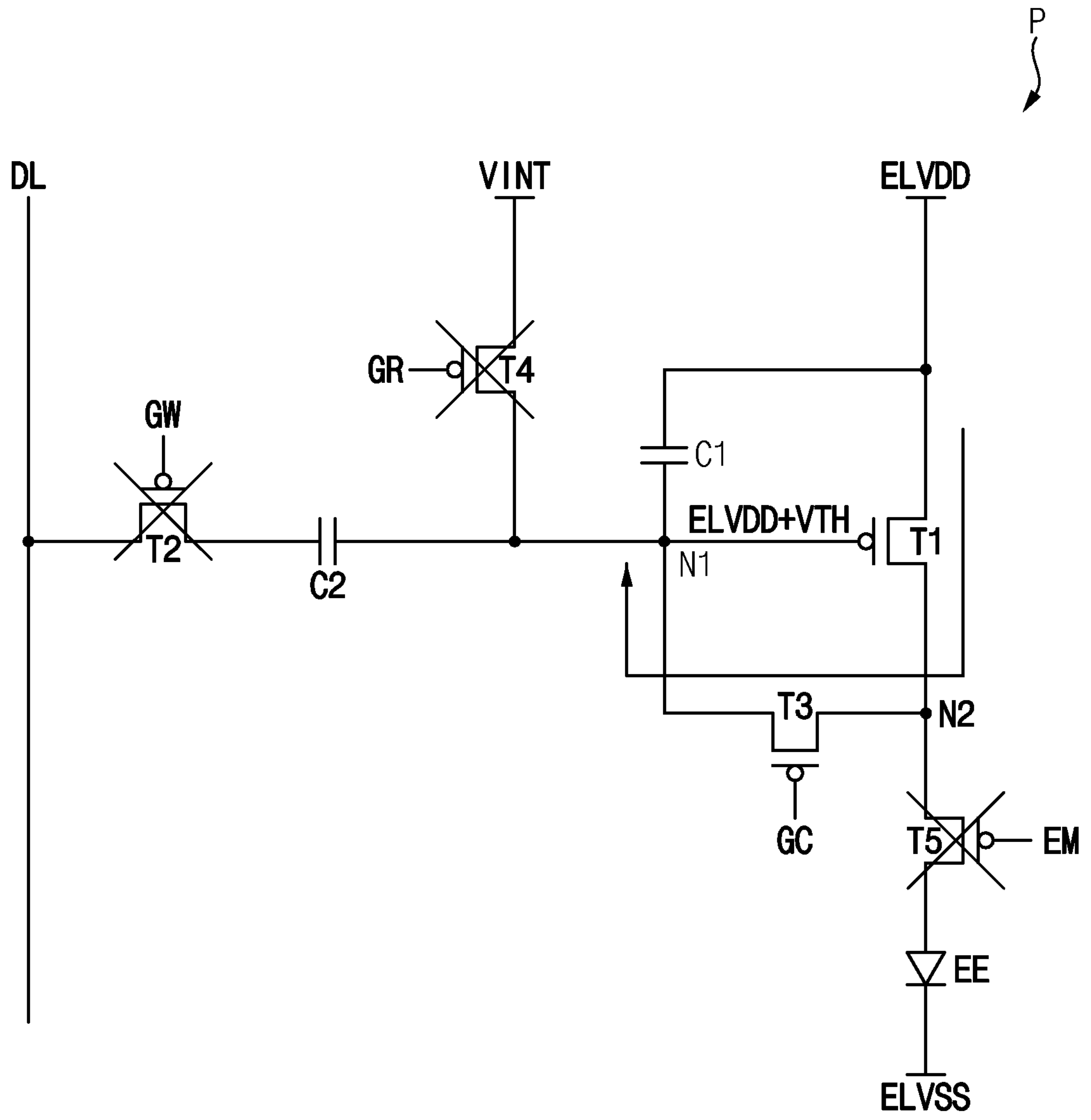
FIGS. 11A and 11B are views showing one example in which the pixel circuit of the display device of FIG. 8 is driven in a compensation period.
Figure 11B:
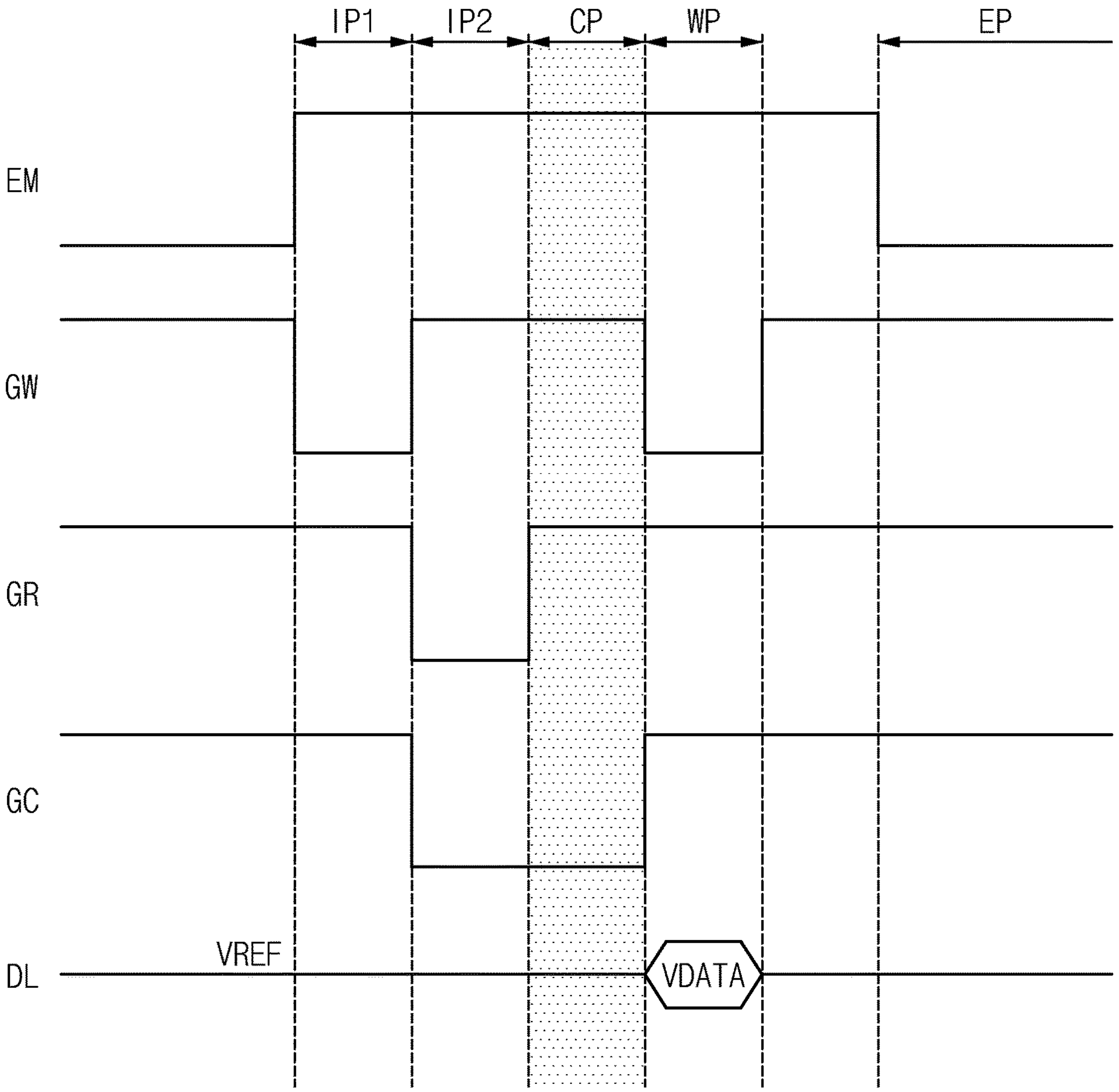

FIGS. 11A and 11B are views showing one example in which the pixel circuit P of the display device of FIG. 8 is driven in a compensation period CP.

Referring to FIGS. 11A and 11B, the compensation gate signal GC may have the activation level in a compensation period CP during which a threshold voltage VTH of the first transistor T1 is compensated. The write gate signal GW, the first initialization gate signal GR, and the emission signal EM may have the inactivation levels in the compensation period CP.

For example, in the compensation period CP, the compensation gate signal GC may have the activation level, the write gate signal GW, the first initialization gate signal GR, and the emission signal EM may have the inactivation levels in the compensation period CP, and the third transistor T3 may be turned on. Accordingly, the first power supply voltage compensated for the threshold voltage VTH (i.e., ELVDD+VTH) may be applied to the first node N1.

Figure 12A:
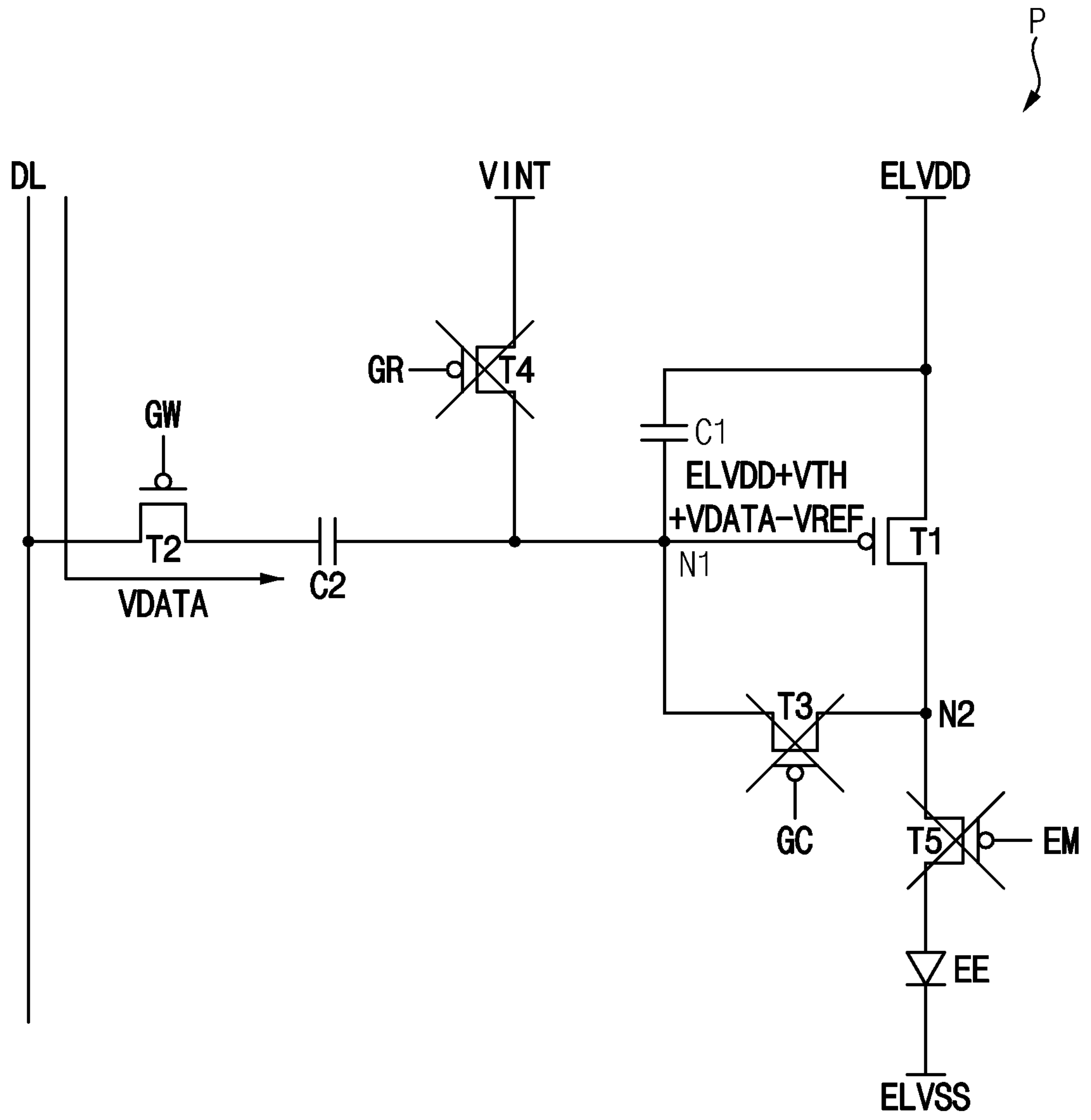
FIGS. 12A and 12B are views showing one example in which the pixel circuit of the display device of FIG. 8 is driven in a data write period.
Figure 12B:
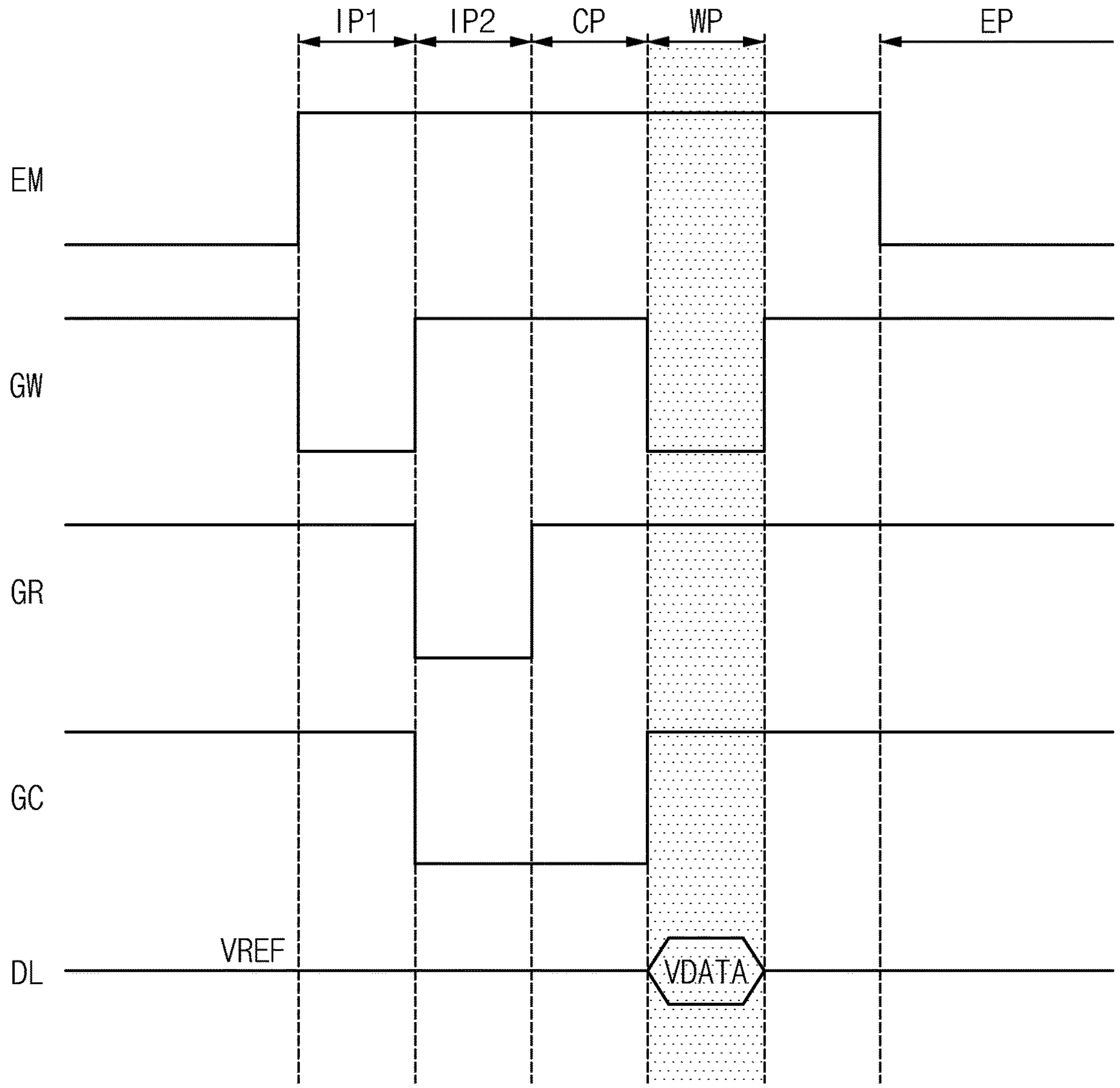

FIGS. 12A and 12B are views showing one example in which the pixel circuit P of the display device of FIG. 8 is driven in a data write period WP.

Referring to FIGS. 12A and 12B, the write gate signal GW may have the activation level in a data write period WP in which the data voltage VDATA is written. The second transistor T2 may apply the data voltage VDATA to the first electrode of the second capacitor C2 in the data write period WP. The first initialization gate signal GR, the compensation gate signal GC, and the emission signal EM may have the inactivation levels in the data write period WP.

For example, in the data write period WP, the write gate signal GW may have the activation level, the first initialization gate signal GR, the compensation gate signal GC, and the emission signal EM may have the inactivation levels, and the second transistor T2 may be turned on. Accordingly, the data voltage VDATA may be applied to the first electrode of the second capacitor C2, and a voltage of the second electrode of the second capacitor C2 (i.e., a voltage of the first node N1) may be increased by a difference between the data voltage VDATA and the reference voltage VREF.

Figure 13A:
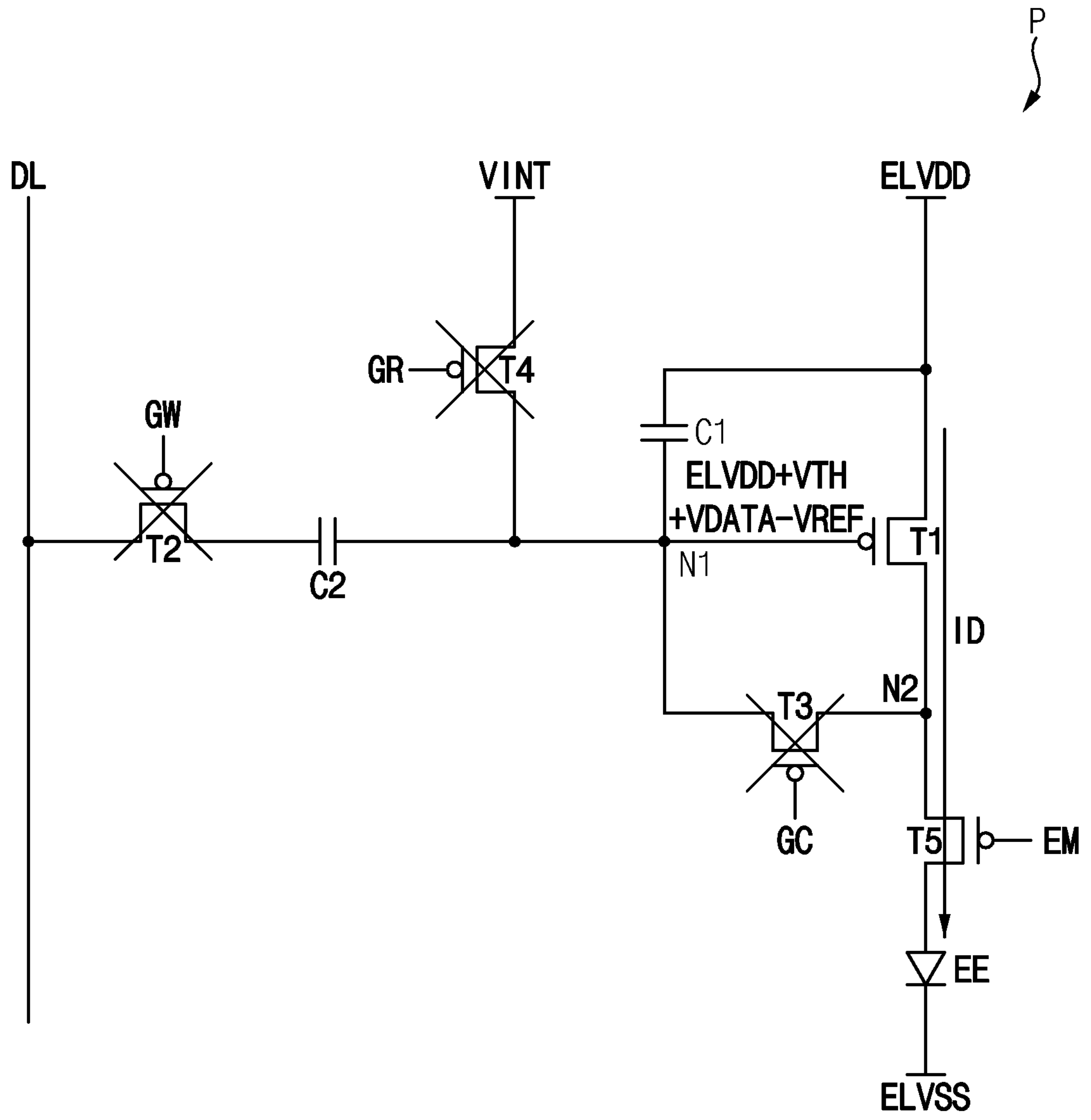
FIGS. 13A and 13B are views showing one example in which the pixel circuit of the display device of FIG. 8 is driven in an emission period.
Figure 13B:
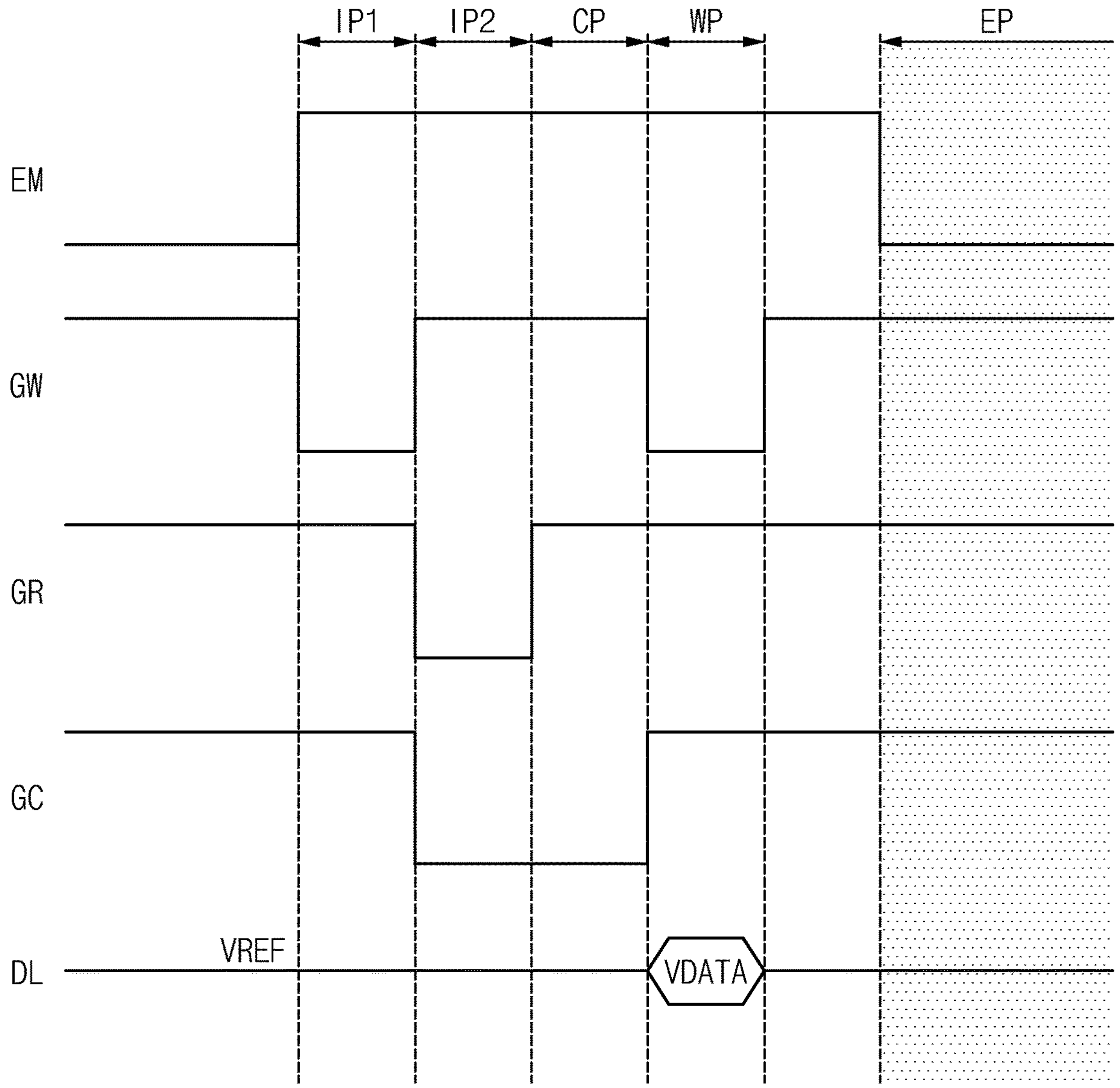

FIGS. 13A and 13B are views showing one example in which the pixel circuit P of the display device of FIG. 8 is driven in an emission period EP.

Referring to FIGS. 13A and 13B, the emission signal EM may have an activation level in an emission period EP in which a light is emitted. The write gate signal GW, the first initialization gate signal GR, and the compensation gate signal GC may have the inactivation levels in the emission period EP.

For example, in the emission period EP, the emission signal EM may have the activation level, the write gate signal GW, the first initialization gate signal GR, and the compensation gate signal GC may have the inactivation levels, and the fifth transistor T5 may be turned on. Accordingly, a driving current ID corresponding to the voltage of the first node N1 may be generated, and the driving current ID may be applied to the light emitting element EE. In other words, the light emitting element EE may emit a light with a luminance corresponding to the driving current ID.

Figure 14:
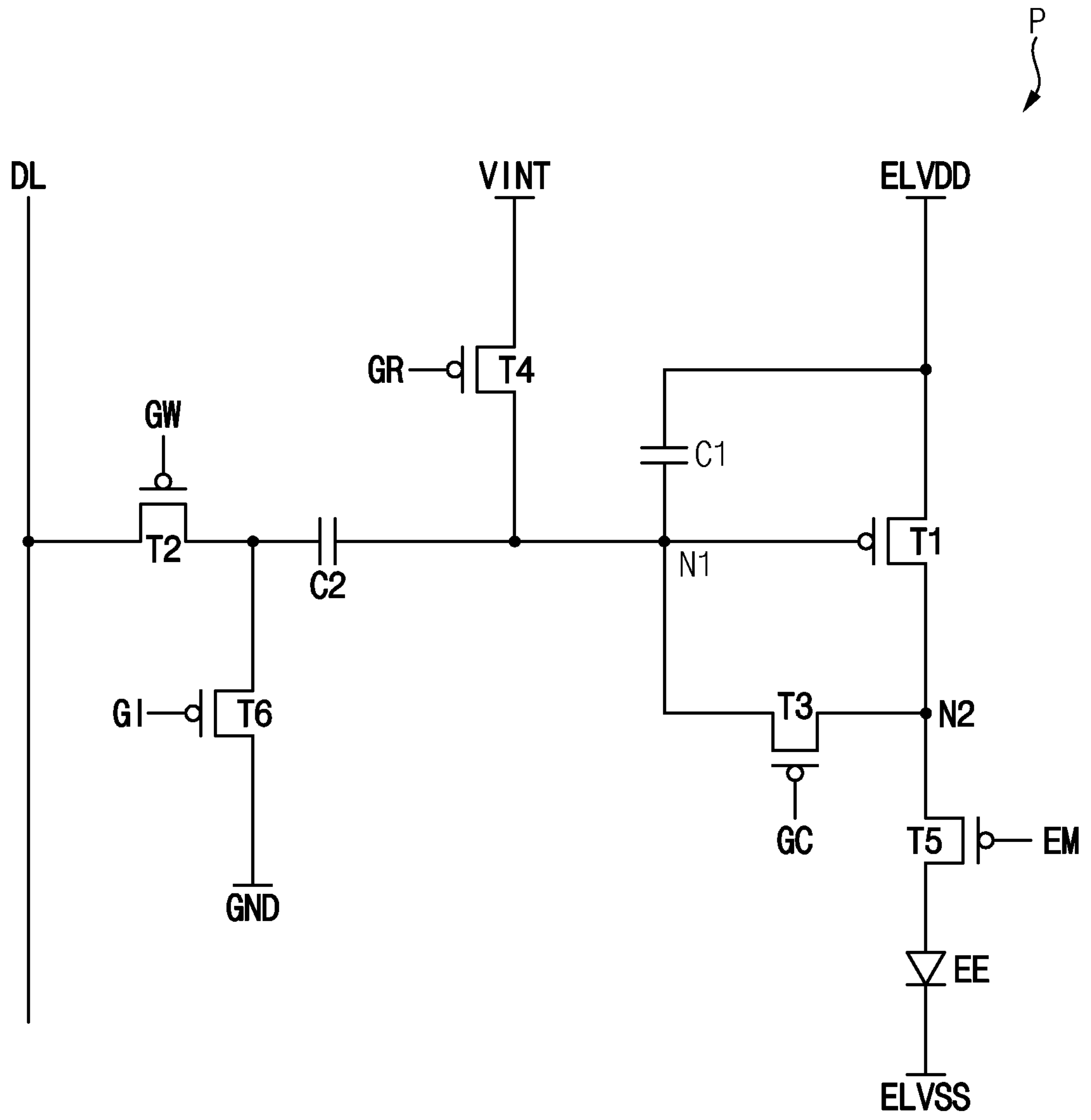
FIG. 14 is a circuit diagram showing a pixel circuit of a display device according to embodiments of the present disclosure.
Figure 15:
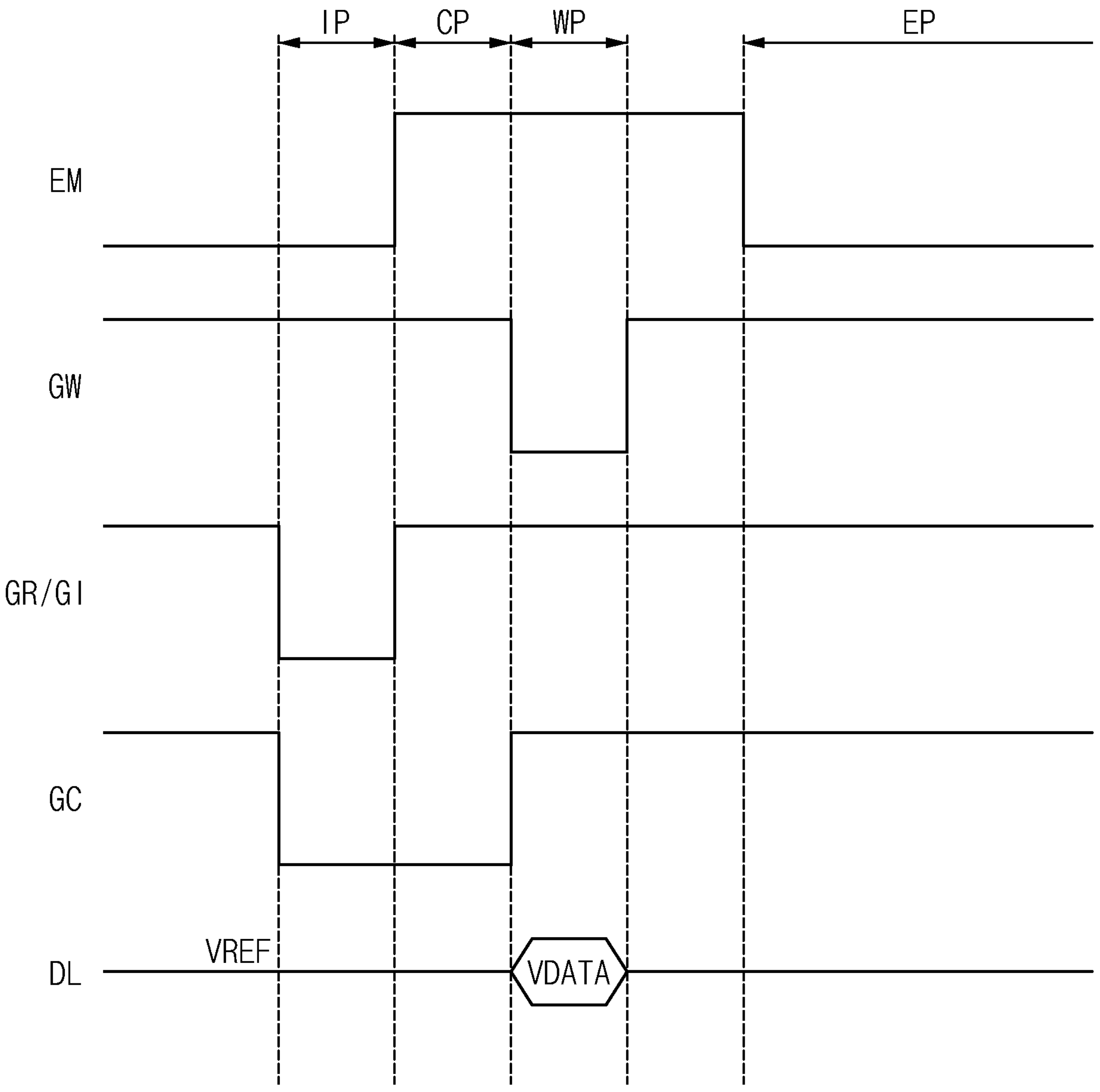
FIG. 15 is a timing diagram showing one example in which the pixel circuit of FIG. 14 is driven.

FIG. 14 is a circuit diagram showing a pixel circuit P of a display device according to embodiments of the present disclosure, and FIG. 15 is a timing diagram showing one example in which the pixel circuit P of FIG. 14 is driven.

Since a display device according to the present embodiments has a configuration that is substantially identical to the configuration of the display device of FIG. 1 except for a sixth transistor T6, the same reference numerals and reference signs will be used for the same or similar components, and redundant descriptions will be omitted.

Referring to FIGS. 14 and 15, a pixel circuit P may further include a sixth transistor T6 configured to connect the first electrode of the second capacitor C2 to a ground GND in response to a second initialization gate signal GI.

For example, the sixth transistor T6 may include a control electrode configured to receive the second initialization gate signal GI, a first electrode connected to the ground GND, and a second electrode connected to the first electrode of the second capacitor C2.

The sixth transistor T6 may be implemented as a PMOS transistor. However, the present disclosure is not limited thereto. For example, the sixth transistor T6 may be implemented as an NMOS transistor.

Figure 16A:
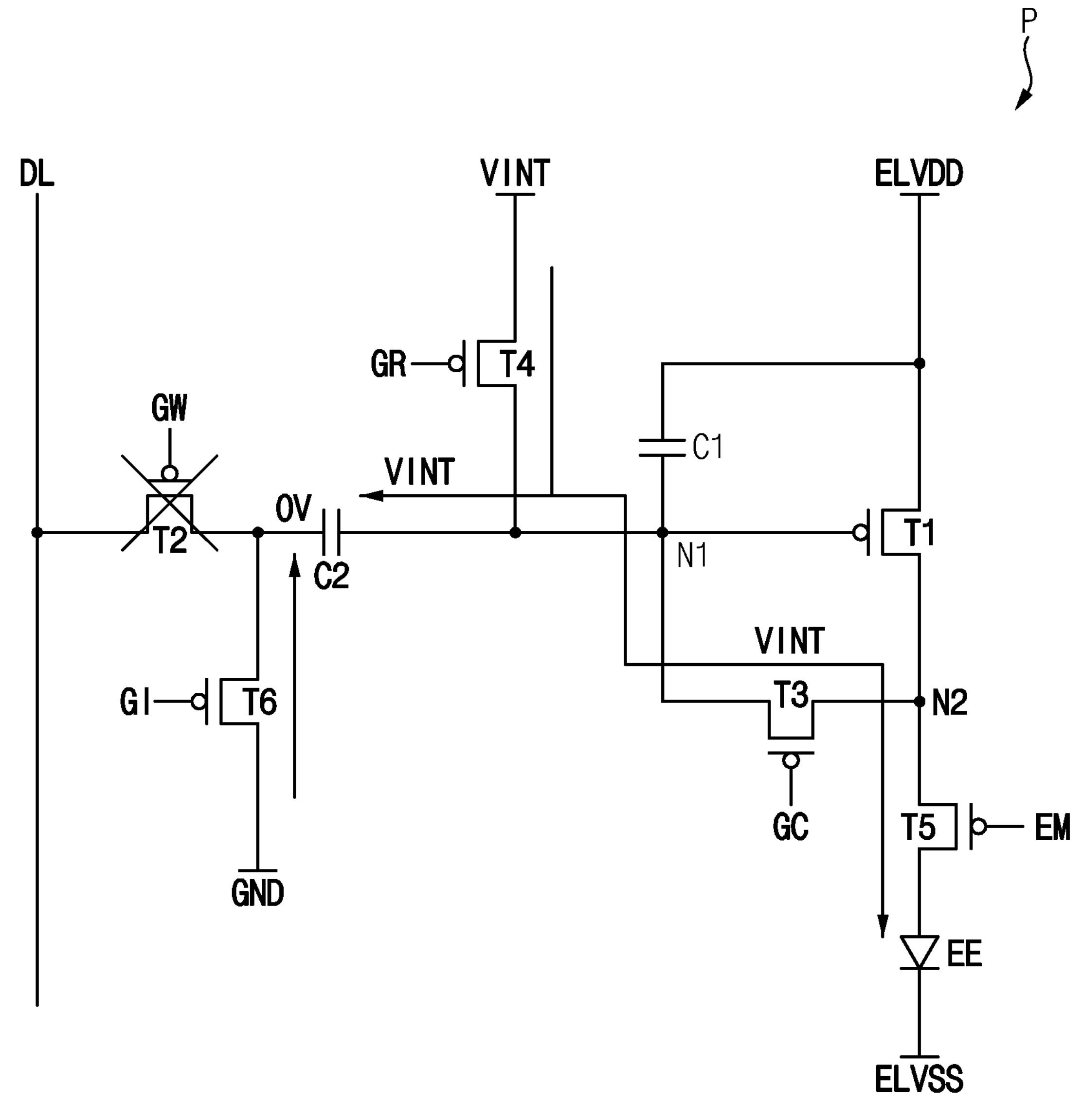
FIGS. 16A and 16B are views showing one example in which the pixel circuit of the display device of FIG. 14 is driven in an initialization period.
Figure 16B:
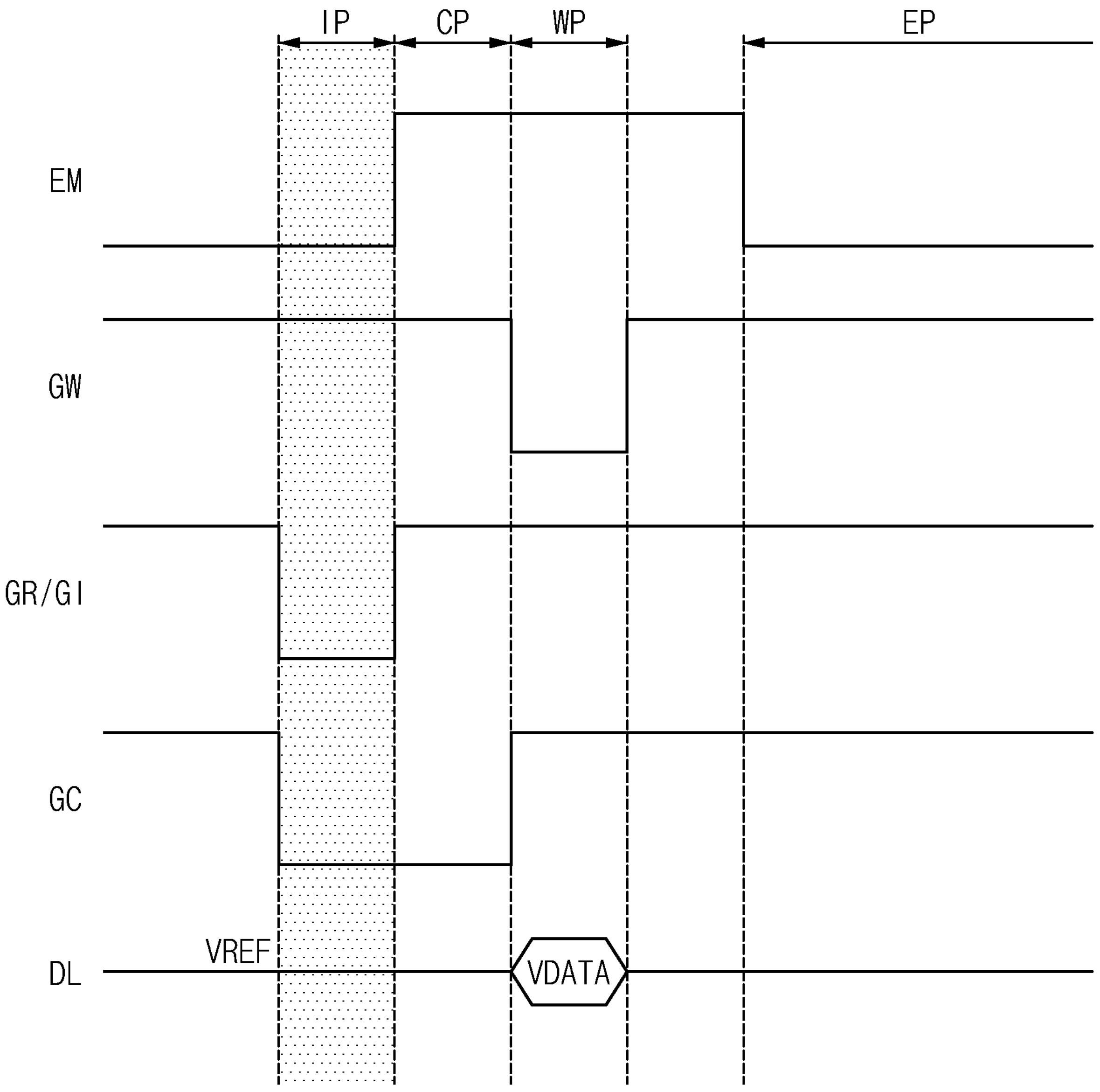

FIGS. 16A and 16B are views showing one example in which the pixel circuit P of the display device of FIG. 14 is driven in an initialization period IP.

Referring to FIGS. 16A and 16B, the first initialization gate signal GR, the second initialization gate signal GI, the compensation gate signal GC, and the emission signal EM may have activation levels in an initialization period IP in which the first capacitor C1, the second capacitor C2, and the light emitting element EE are initialized. The write gate signal GW may have an inactivation level in the initialization period IP.

For example, in the initialization period IP, the first initialization gate signal GR, the second initialization gate signal GI, the compensation gate signal GC, and the emission signal EM may have the activation levels, the write gate signal GW may have the inactivation level, and the third to sixth transistors T3, T4, T5, and T6 may be turned on. Accordingly, the first electrode of the second capacitor may be connected to the ground GND (i.e., 0 V), and the initialization voltage VINT may be applied to the second electrode of the second capacitor, the second electrode of the first capacitor, and the first electrode of the light emitting element EE. In other words, the first capacitor C1, the second capacitor C2, and the light emitting element EE may be initialized.

Figure 17A:
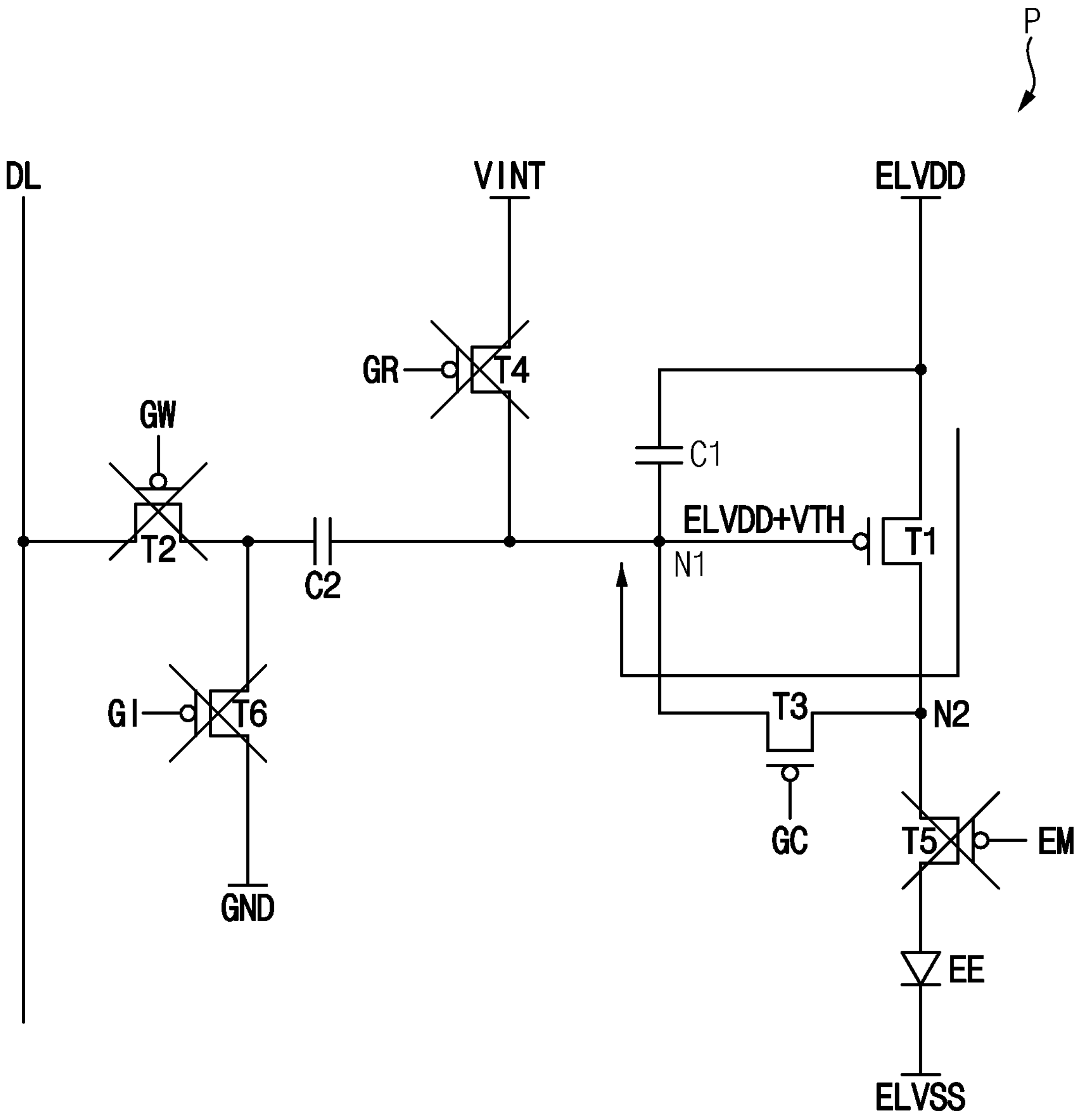
FIGS. 17A and 17B are views showing one example in which the pixel circuit of the display device of FIG. 14 is driven in a compensation period.
Figure 17B:
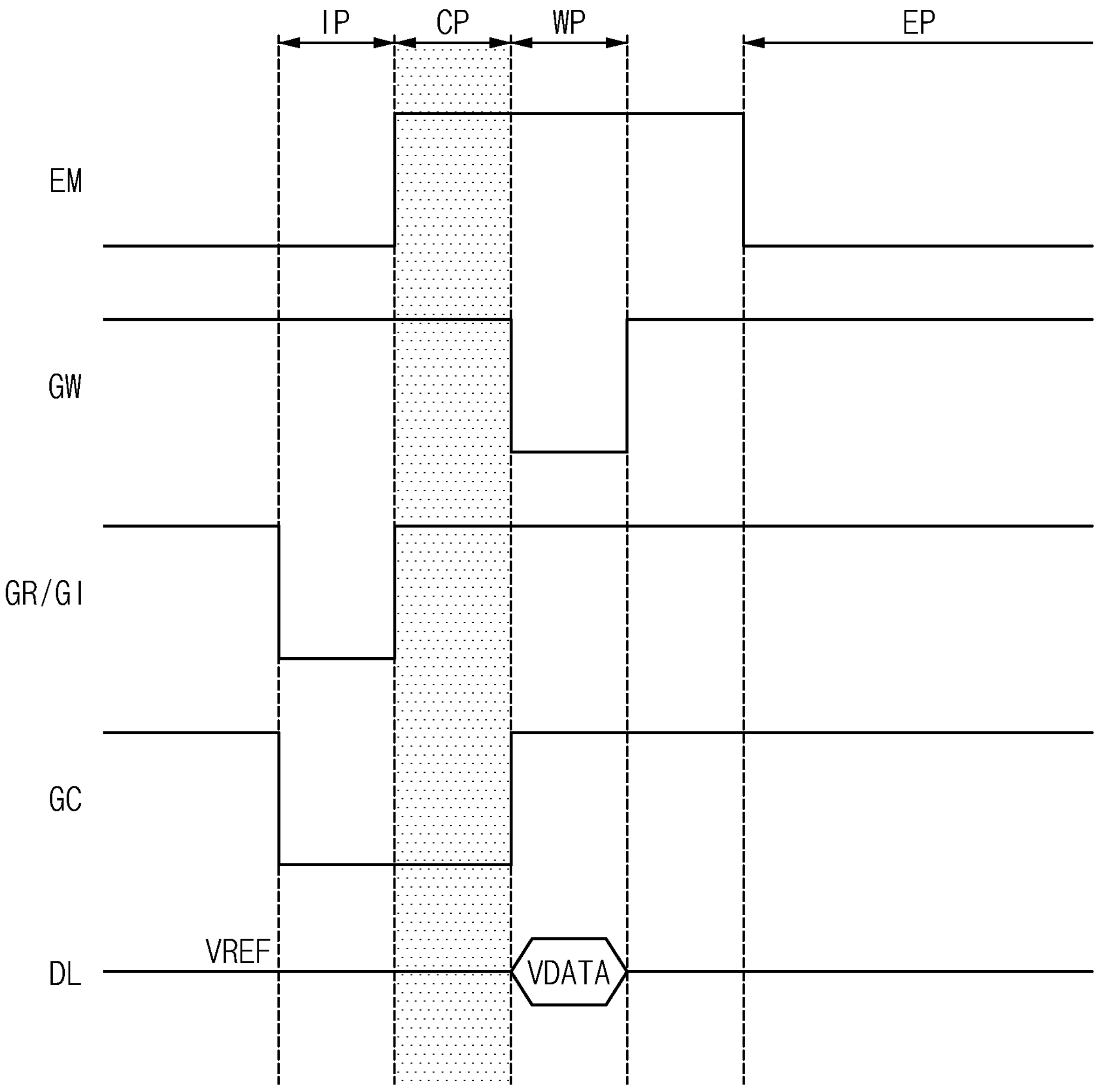

FIGS. 17A and 17B are views showing one example in which the pixel circuit P of the display device of FIG. 14 is driven in a compensation period CP.

Referring to FIGS. 17A and 17B, the compensation gate signal GC may have the activation level in a compensation period CP during which a threshold voltage VTH of the first transistor T1 is compensated. The write gate signal GW, the first initialization gate signal GR, the second initialization gate signal GI, and the emission signal EM may have inactivation levels in the compensation period CP.

For example, in the compensation period CP, the compensation gate signal GC may have the activation level, the write gate signal GW, the first initialization gate signal GR, the second initialization gate signal GI, and the emission signal EM may have the inactivation levels in the compensation period CP, and the third transistor T3 may be turned on. Accordingly, the first power supply voltage compensated for the threshold voltage VTH (i.e., ELVDD+VTH) may be applied to the first node N1.

Figure 18A:
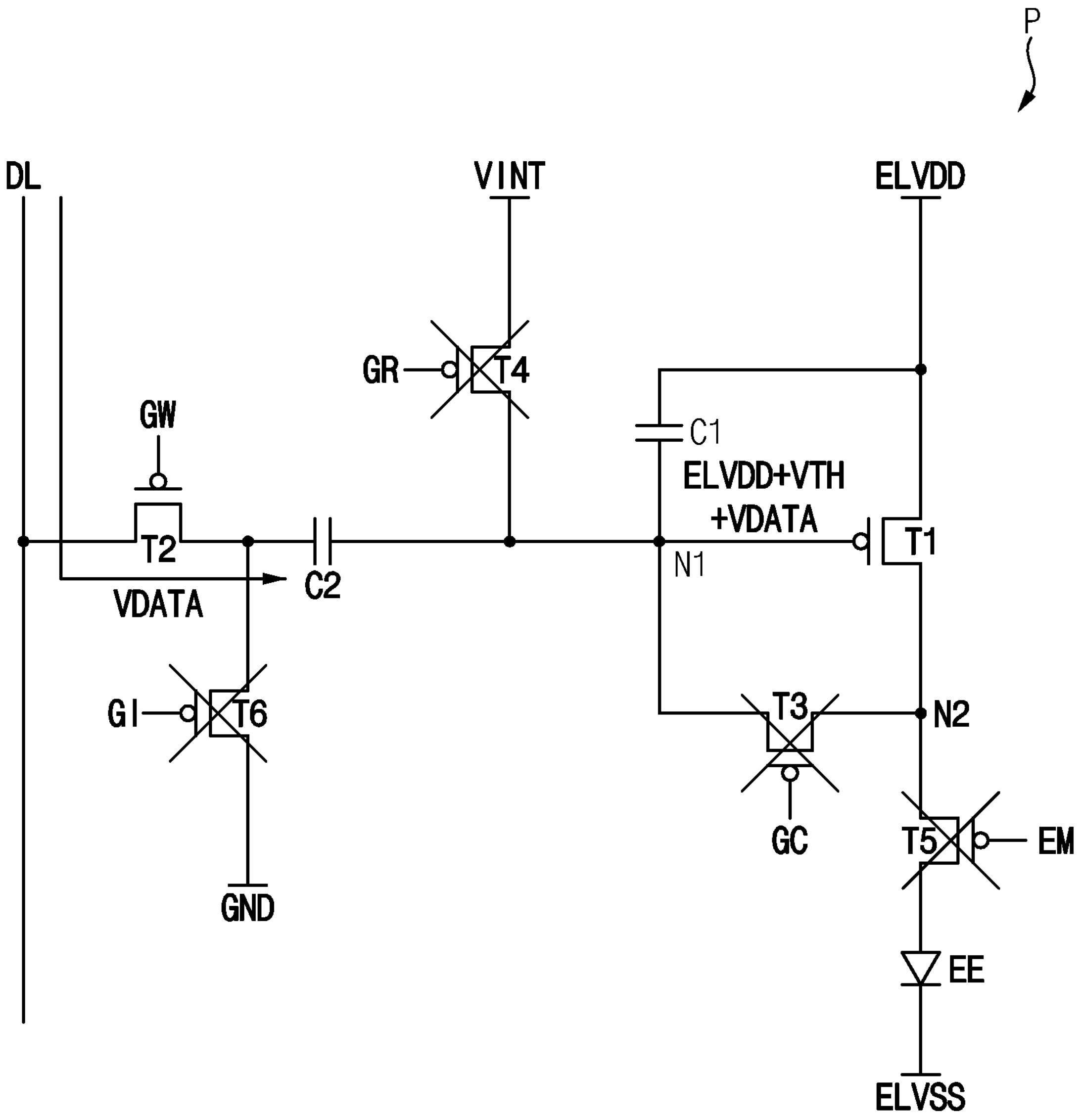
FIGS. 18A and 18B are views showing one example in which the pixel circuit of the display device of FIG. 14 is driven in a data write period.
Figure 18B:
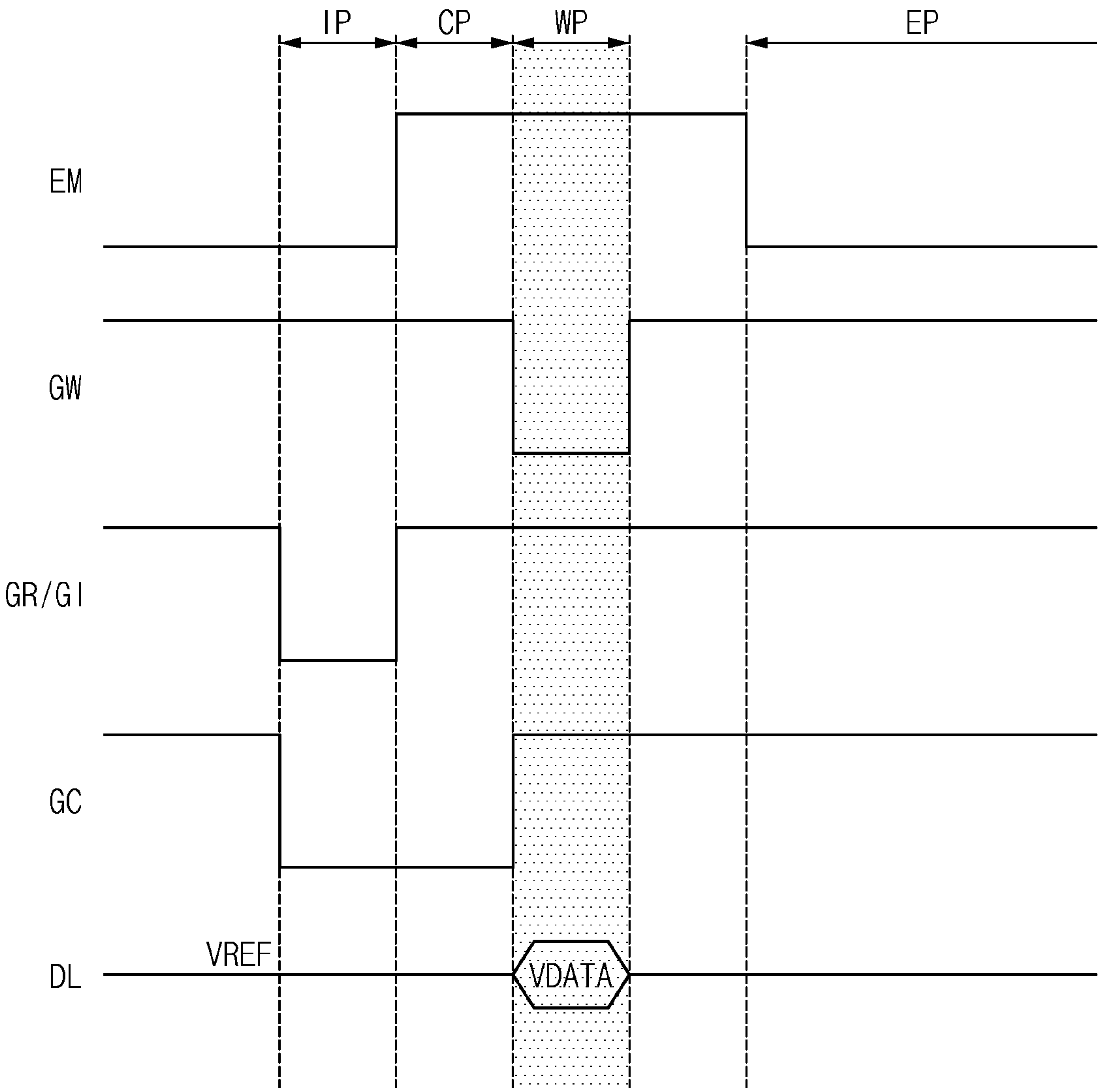

FIGS. 18A and 18B are views showing one example in which the pixel circuit P of the display device of FIG. 14 is driven in a data write period WP.

Referring to FIGS. 18A and 18B, the write gate signal GW may have an activation level in a data write period WP in which the data voltage VDATA is written. The second transistor T2 may apply the data voltage VDATA to the first electrode of the second capacitor C2 in the data write period WP. The first initialization gate signal GR, the second initialization gate signal GI, the compensation gate signal GC, and the emission signal EM may have inactivation levels in the data write period WP.

For example, in the data write period WP, the write gate signal GW may have the activation level, the first initialization gate signal GR, the second initialization gate signal GI, the compensation gate signal GC, and the emission signal EM may have the inactivation levels, and the second transistor T2 may be turned on. Accordingly, the data voltage VDATA may be applied to the first electrode of the second capacitor C2, and a voltage of the second electrode of the second capacitor C2 (i.e., a voltage of the first node N1) may be increased by the data voltage VDATA.

Figure 19A:
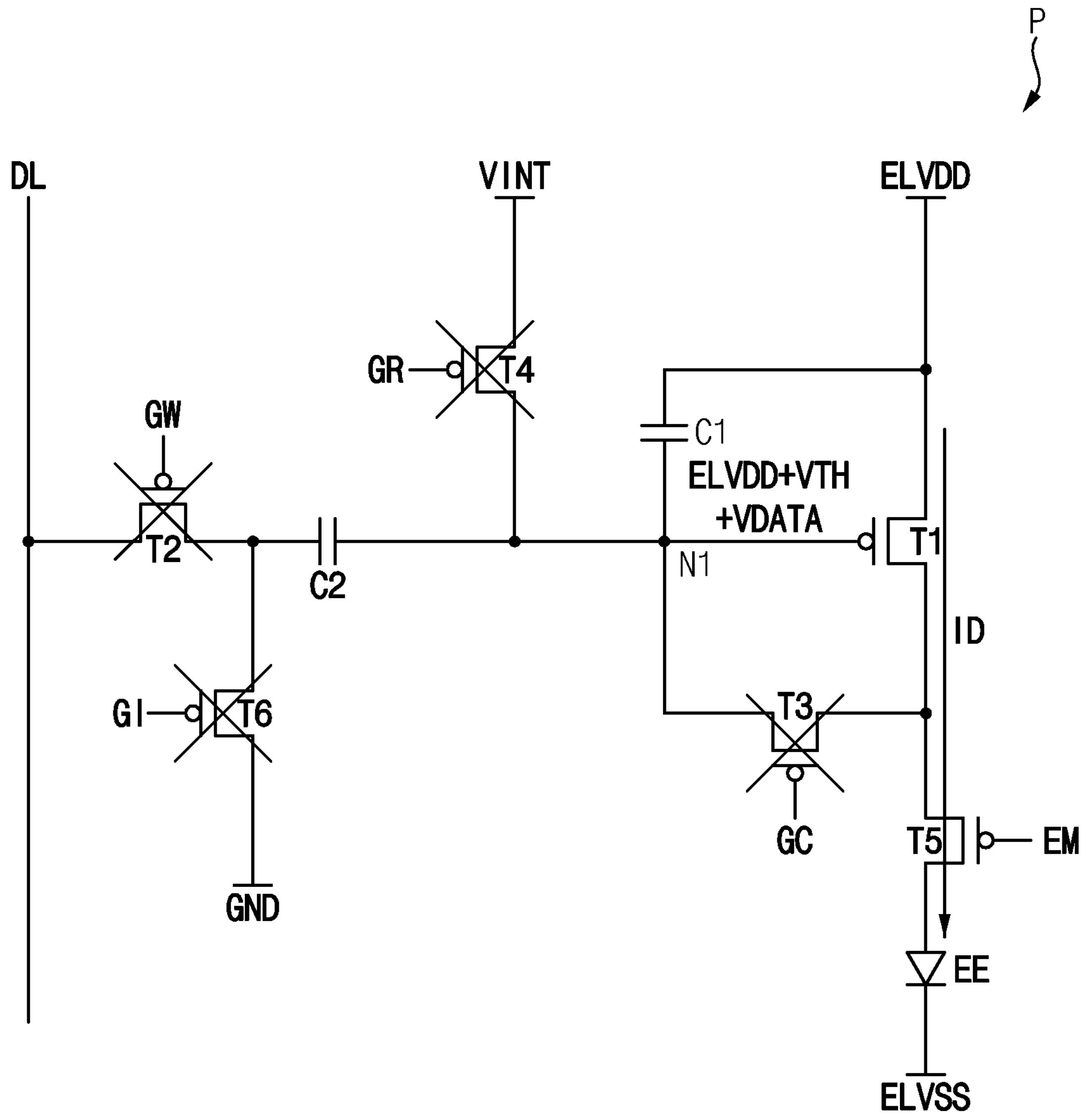
FIGS. 19A and 19B are views showing one example in which the pixel circuit of the display device of FIG. 14 is driven in an emission period.
Figure 19B:
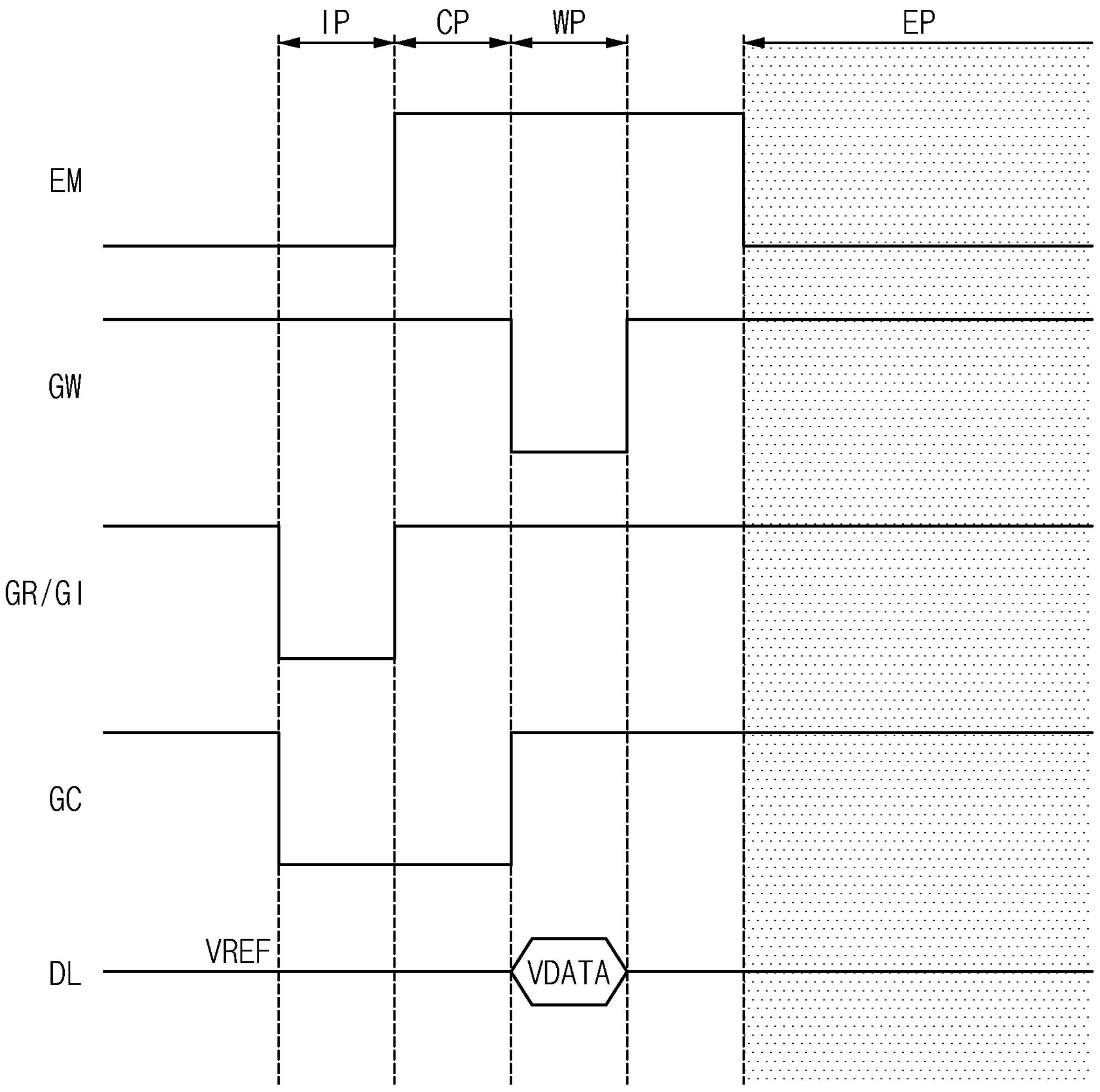

FIGS. 19A and 19B are views showing one example in which the pixel circuit P of the display device of FIG. 14 is driven in an emission period EP.

Referring to FIGS. 19A and 19B, the emission signal EM may have the activation level in an emission period EP in which a light is emitted. The write gate signal GW, the first initialization gate signal GR, the second initialization gate signal GI, and the compensation gate signal GC may have the inactivation levels in the emission period EP.

For example, in the emission period EP, the emission signal EM may have the activation level, the write gate signal GW, the first initialization gate signal GR, the second initialization gate signal GI, and the compensation gate signal GC may have the inactivation levels, and the fifth transistor T5 may be turned on. Accordingly, a driving current ID corresponding to the voltage of the first node N1 may be generated, and the driving current ID may be applied to the light emitting element EE. In other words, the light emitting element EE may emit a light with a luminance corresponding to the driving current ID.

Figure 20:
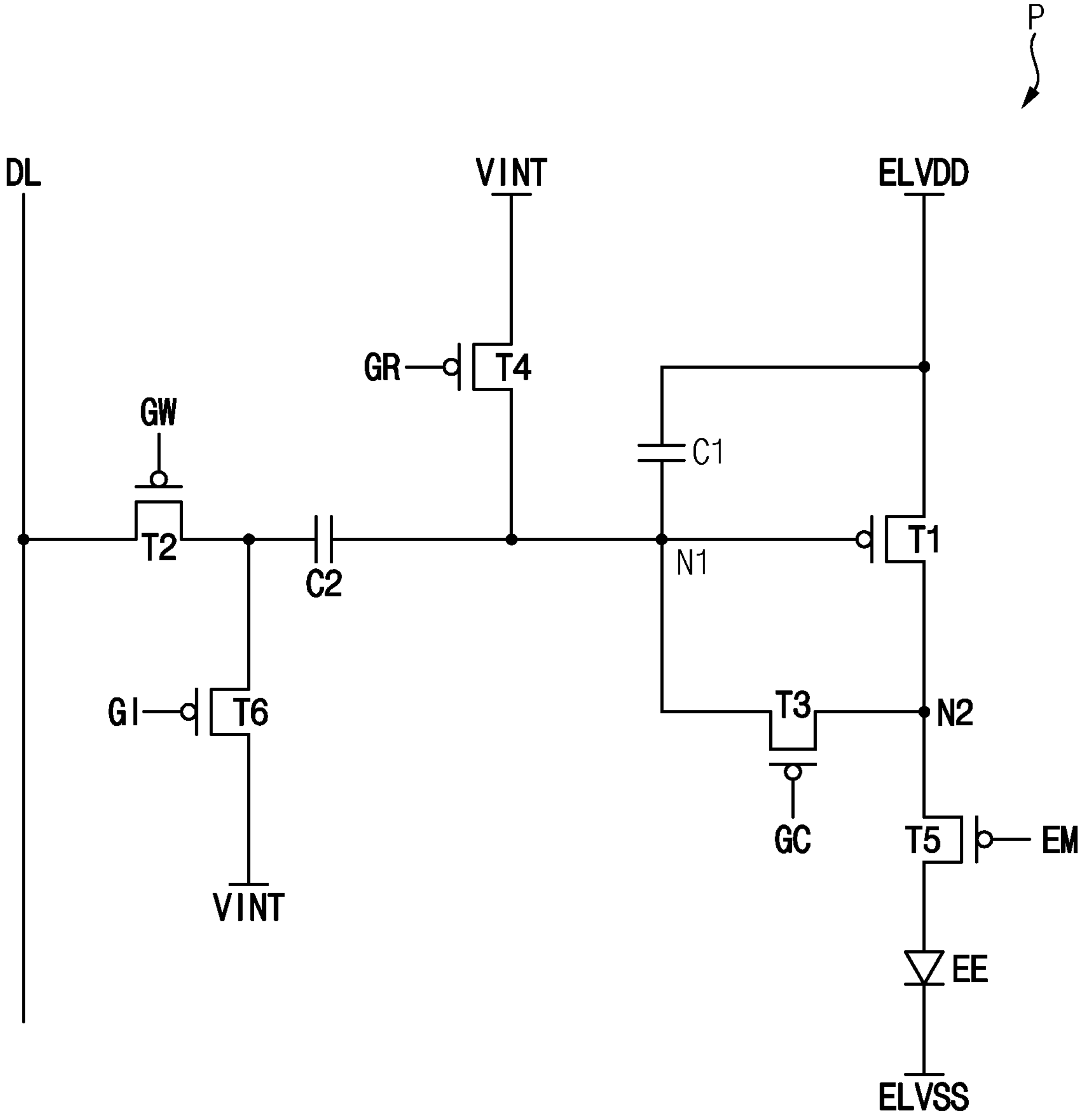
FIG. 20 is a circuit diagram showing a pixel circuit of a display device according to embodiments of the present disclosure.

FIG. 20 is a circuit diagram showing a pixel circuit P of a display device according to embodiments of the present disclosure.

Since a pixel circuit according to the present embodiments has a configuration that is substantially identical to the configuration of the pixel circuit of FIG. 14 except for the first electrode of the sixth transistor T6, the same reference numerals and reference signs will be used for the same or similar components, and redundant descriptions will be omitted.

Referring to FIG. 20, the pixel circuit P may further include a sixth transistor T6 configured to apply the initialization voltage VINT to the first electrode of the second capacitor C2 in response to a second initialization gate signal GI.

For example, the sixth transistor T6 may include a control electrode configured to receive the second initialization gate signal GI, a first electrode configured to receive the initialization voltage VINT, and a second electrode connected to the first electrode of the second capacitor C2.

Figure 21:
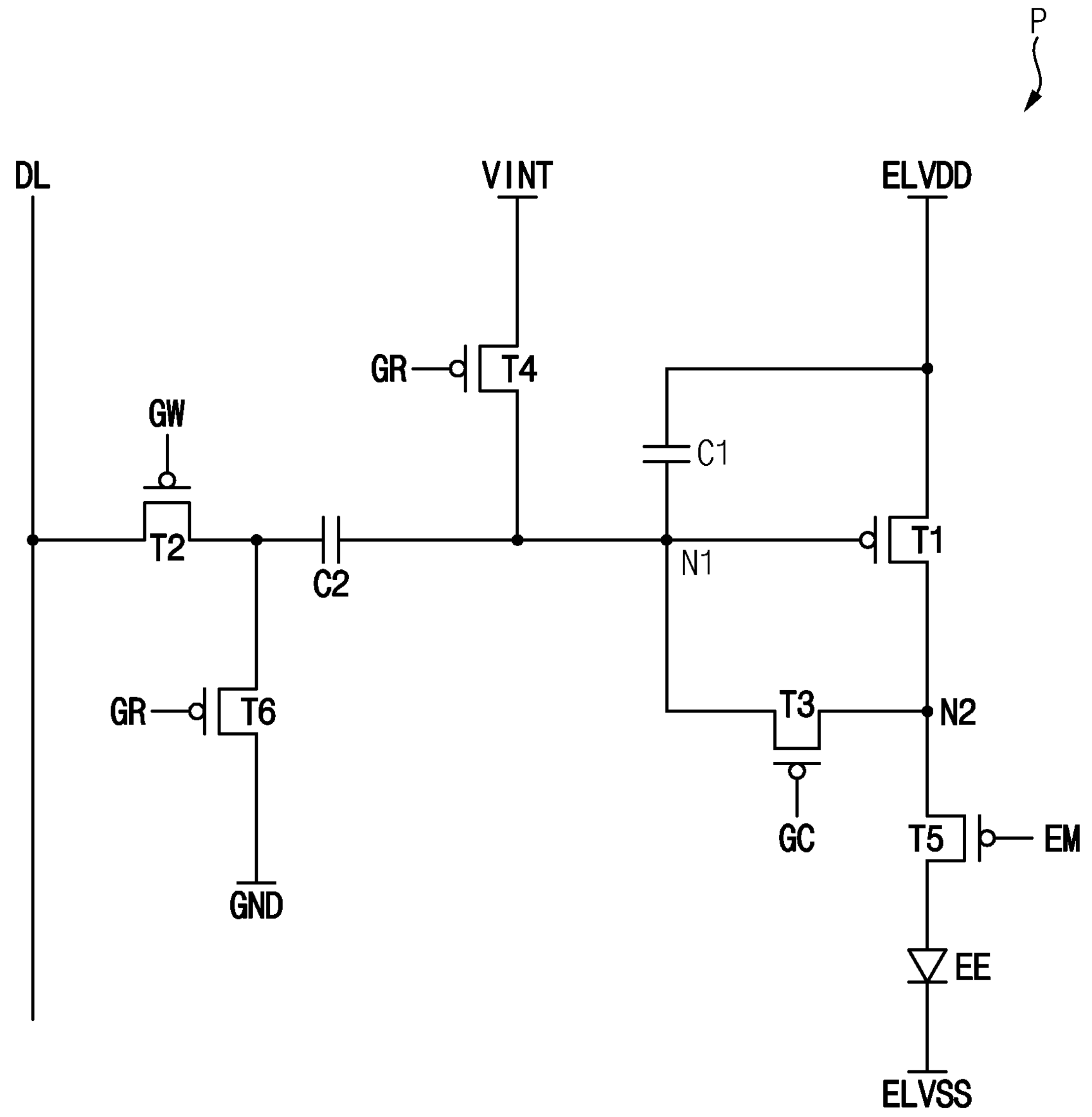
FIG. 21 is a circuit diagram showing a pixel circuit of a display device according to embodiments of the present disclosure.

FIG. 21 is a circuit diagram showing a pixel circuit P of a display device according to embodiments of the present disclosure.

Since a pixel circuit according to the present embodiments has a configuration that is substantially identical to the configuration of the pixel circuit of FIG. 14 except for the control electrode of the sixth transistor T6, the same reference numerals and reference signs will be used for the same or similar components, and redundant descriptions will be omitted.

Referring to FIG. 21, the pixel circuit P may further include a sixth transistor T6 configured to connect the first electrode of the second capacitor C2 to a ground GND in response to the first initialization gate signal GR.

For example, the sixth transistor T6 may include a control electrode configured to receive the first initialization gate signal GR, a first electrode connected to the ground GND, and a second electrode connected to the first electrode of the second capacitor C2.

Figure 22:
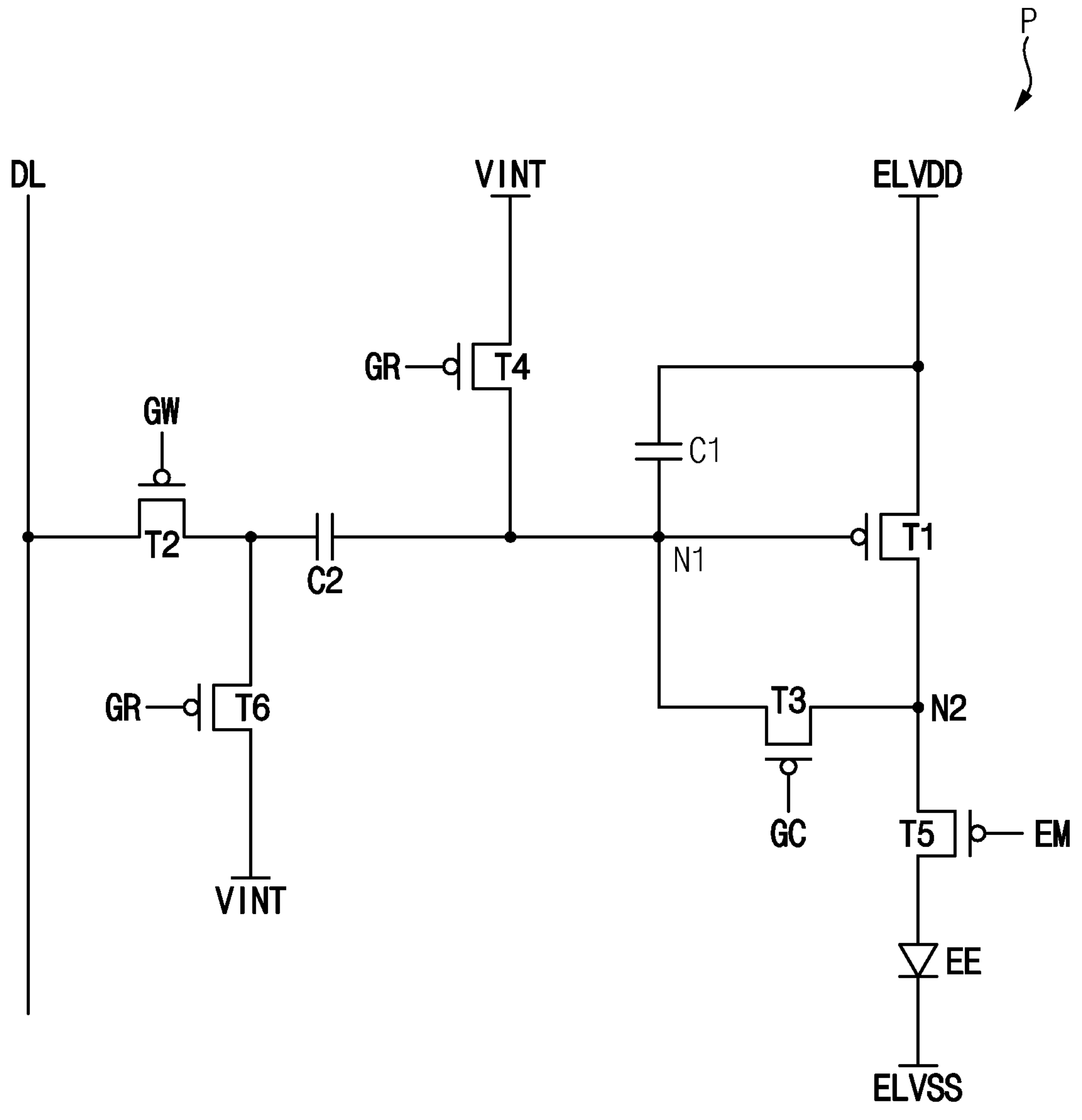
FIG. 22 is a circuit diagram showing a pixel circuit of a display device according to embodiments of the present disclosure.

FIG. 22 is a circuit diagram showing a pixel circuit P of a display device according to embodiments of the present disclosure.

Since a pixel circuit according to the present embodiments has a configuration that is substantially identical to the configuration of the pixel circuit of FIG. 14 except for the control electrode and the first electrode of the sixth transistor T6, the same reference numerals and reference signs will be used for the same or similar components, and redundant descriptions will be omitted.

Referring to FIG. 22, the pixel circuit P may further include a sixth transistor T6 configured to apply the initialization voltage VINT to the first electrode of the second capacitor C2 in response to the first initialization gate signal GR.

For example, the sixth transistor T6 may include a control electrode configured to receive the first initialization gate signal GR, a first electrode configured to receive the initialization voltage VINT, and a second electrode connected to the first electrode of the second capacitor C2.

Figure 23:
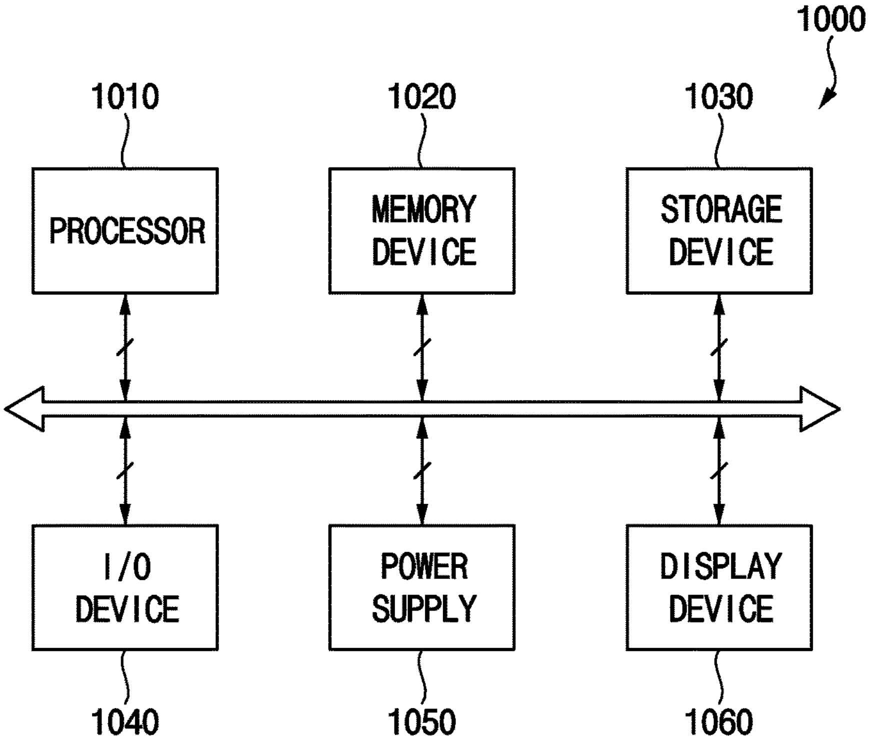
FIG. 23 is a block diagram showing an electronic device according to embodiments of the present disclosure.
Figure 24:
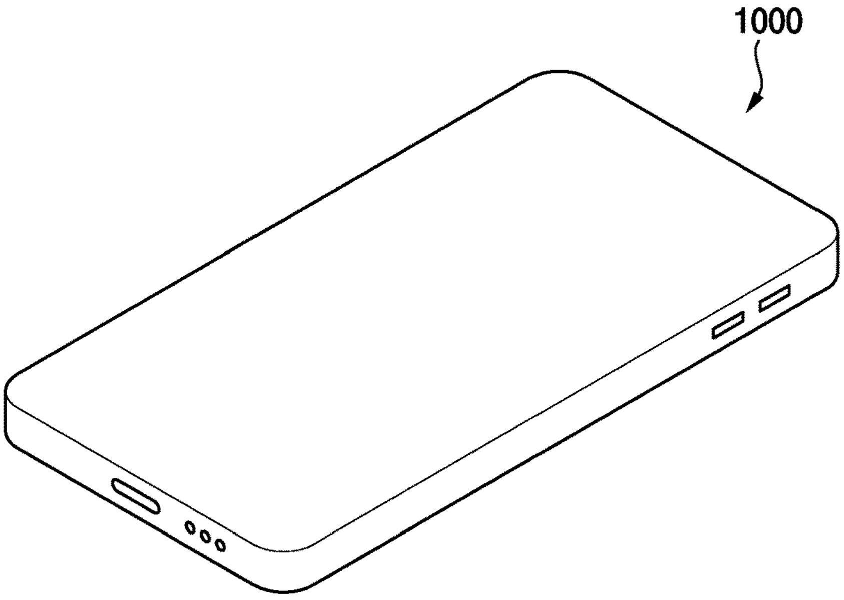
FIG. 24 is a diagram showing one example in which the electronic device of FIG. 23 is implemented as a smart phone.

FIG. 23 is a block diagram showing an electronic device according to embodiments of the present disclosure, and FIG. 24 is a diagram showing one example in which the electronic device of FIG. 23 is implemented as a smart phone.

Referring to FIGS. 23 and 24, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc. In an embodiment, as shown in FIG. 24, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. Here, the display device 1060 may be an organic light emitting display device or a quantum-dot light emitting display device. However, the display device 1060 is not limited thereto. The display device 1060 may be coupled to other components via the buses or other communication links. A pixel circuit of the display device 1060 may be implemented with less transistors, so that the reduced pixel size and high pixel density (high ppi) may be achieved.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel circuit comprising:

a light emitting element;

a first transistor configured to apply a driving current to the light emitting element;

a second transistor configured to write a data voltage in response to a write gate signal;

a first capacitor connected to a control electrode of the first transistor;

a second capacitor including a first electrode connected to the second transistor and a second electrode connected to the control electrode of the first transistor;

a third transistor configured to diode-connect the first transistor in response to a compensation gate signal;

a fourth transistor configured to apply an initialization voltage to the control electrode of the first transistor in response to a first initialization gate signal; and a fifth transistor configured to transmit the driving current to the light emitting element in response to an emission signal, wherein the third transistor and the fourth transistor are simultaneously turned on in an initialization period.

2. The pixel circuit of claim 1, wherein the first transistor includes the control electrode connected to a first node, a first electrode configured to receive a first power supply voltage, and a second electrode connected to a second node, wherein the first capacitor includes a first electrode configured to receive the first power supply voltage and a second electrode connected to the first node, wherein the second transistor includes a control electrode configured to receive the write gate signal, a first electrode connected to a data line through which the data voltage is received, and a second electrode connected to the first electrode of the second capacitor, wherein the second capacitor includes the first electrode connected to the second electrode of the second transistor and the second electrode connected to the first node, wherein the third transistor includes a control electrode configured to receive the compensation gate signal, a first electrode connected to the second node, and a second electrode connected to the first node, wherein the fourth transistor includes a control electrode configured to receive the first initialization gate signal, a first electrode configured to receive the initialization voltage, and a second electrode connected to the first node, wherein the fifth transistor includes a control electrode configured to receive the emission signal, a first electrode connected to the second node, and a second electrode connected to a first electrode of the light emitting element, and wherein the light emitting element includes the first electrode connected to the second electrode of the fifth transistor and a second electrode configured to receive a second power supply voltage.

3. The pixel circuit of claim 1, wherein the first to fifth transistors are PMOS transistors.

4. The pixel circuit of claim 1, wherein the write gate signal, the first initialization gate signal, the compensation gate signal, and the emission signal have activation levels in the initialization period in which the first capacitor, the second capacitor, and the light emitting element are initialized.

5. The pixel circuit of claim 4, wherein the write gate signal has the activation level in a data write period in which the data voltage is written, and wherein the second transistor is configured to apply a reference voltage to the first electrode of the second capacitor in the initialization period and to apply the data voltage to the first electrode of the second capacitor in the data write period.

6. The pixel circuit of claim 1, wherein the initialization period includes a first initialization period and a second initialization period, wherein the write gate signal has an activation level in the first initialization period in which the first electrode of the second capacitor is initialized, and wherein the first initialization gate signal and the compensation gate signal have activation levels in the second initialization period in which the second electrode of the second capacitor and the first capacitor are initialized.

7. The pixel circuit of claim 6, wherein the write gate signal has the activation level in a data write period in which the data voltage is written, and wherein the second transistor is configured to apply a reference voltage to the first electrode of the second capacitor in the first initialization period and to apply the data voltage to the first electrode of the second capacitor in the data write period.

8. The pixel circuit of claim 6, wherein the first initialization gate signal, the compensation gate signal, and the emission signal have inactivation levels in the first initialization period.

9. The pixel circuit of claim 6, wherein the write gate signal and the emission signal have inactivation levels in the second initialization period.

10. The pixel circuit of claim 1, further comprising:

a sixth transistor configured to connect the first electrode of the second capacitor to a ground in response to a second initialization gate signal.

11. The pixel circuit of claim 10, wherein the sixth transistor includes a control electrode configured to receive the second initialization gate signal, a first electrode connected to the ground, and a second electrode connected to the first electrode of the second capacitor.

12. The pixel circuit of claim 10, wherein the first initialization gate signal, the second initialization gate signal, the compensation gate signal, and the emission signal have activation levels in the initialization period in which the first capacitor, the second capacitor, and the light emitting element are initialized.

13. The pixel circuit of claim 1, further comprising:

a sixth transistor configured to apply the initialization voltage to the first electrode of the second capacitor in response to a second initialization gate signal.

14. The pixel circuit of claim 13, wherein the sixth transistor includes a control electrode configured to receive the second initialization gate signal, a first electrode configured to receive the initialization voltage, and a second electrode connected to the first electrode of the second capacitor.

15. The pixel circuit of claim 1, further comprising:

a sixth transistor configured to connect the first electrode of the second capacitor to a ground in response to the first initialization gate signal.

16. The pixel circuit of claim 1, further comprising:

a sixth transistor configured to apply the initialization voltage to the first electrode of the second capacitor in response to the first initialization gate signal.

17. A display device comprising:

a display panel including a pixel circuit;

a data driver configured to apply a data voltage to the pixel circuit;

a gate driver configured to apply a write gate signal, a compensation gate signal, and a first initialization gate signal to the pixel circuit;

an emission driver configured to apply an emission signal to the pixel circuit; and a timing controller configured to control the data driver, the gate driver, and the emission driver, wherein the pixel circuit includes:

a light emitting element;

a first transistor configured to apply a driving current to the light emitting element;

a second transistor configured to write the data voltage in response to the write gate signal;

a first capacitor connected to a control electrode of the first transistor;

a second capacitor including a first electrode connected to the second transistor and a second electrode connected to the control electrode of the first transistor;

a third transistor configured to diode-connect the first transistor in response to the compensation gate signal;

a fourth transistor configured to apply an initialization voltage to the control electrode of the first transistor in response to the first initialization gate signal; and a fifth transistor configured to transmit the driving current to the light emitting element in response to the emission signal, wherein the third transistor and the fourth transistor are simultaneously turned on in an initialization period.

18. The display device of claim 17, wherein the first transistor includes the control electrode connected to a first node, a first electrode configured to receive a first power supply voltage, and a second electrode connected to a second node, wherein the first capacitor includes a first electrode configured to receive the first power supply voltage and a second electrode connected to the first node, wherein the second transistor includes a control electrode configured to receive the write gate signal, a first electrode connected to a data line through which the data voltage is received, and a second electrode connected to the first electrode of the second capacitor, wherein the second capacitor includes the first electrode connected to the second electrode of the second transistor and the second electrode connected to the first node, wherein the third transistor includes a control electrode configured to receive the compensation gate signal, a first electrode connected to the second node, and a second electrode connected to the first node, wherein the fourth transistor includes a control electrode configured to receive the first initialization gate signal, a first electrode configured to receive the initialization voltage, and a second electrode connected to the first node, wherein the fifth transistor includes a control electrode configured to receive the emission signal, a first electrode connected to the second node, and a second electrode connected to a first electrode of the light emitting element, and wherein the light emitting element includes the first electrode connected to the second electrode of the fifth transistor and a second electrode configured to receive a second power supply voltage.

19. The display device of claim 17, wherein the first to fifth transistors are PMOS transistors.

20. The display device of claim 17, wherein the pixel circuit further includes:

a sixth transistor configured to connect the first electrode of the second capacitor to a ground in response to a second initialization gate signal.

21. An electronic apparatus comprising:

a display panel including a pixel circuit;

a data driver configured to apply a data voltage to the pixel circuit;

a gate driver configured to apply a write gate signal, a compensation gate signal, and a first initialization gate signal to the pixel circuit;

an emission driver configured to apply an emission signal to the pixel circuit;

a timing controller configured to control the data driver, the gate driver, and the emission driver; and a host processor providing input image data and an input control signal to the timing controller, wherein the pixel circuit includes:

a light emitting element;

a first transistor configured to apply a driving current to the light emitting element;

a second transistor configured to write the data voltage in response to the write gate signal;

a first capacitor connected to a control electrode of the first transistor;

a second capacitor including a first electrode connected to the second transistor and a second electrode connected to the control electrode of the first transistor;

a third transistor configured to diode-connect the first transistor in response to the compensation gate signal;

a fourth transistor configured to apply an initialization voltage to the control electrode of the first transistor in response to the first initialization gate signal; and a fifth transistor configured to transmit the driving current to the light emitting element in response to the emission signal, wherein the third transistor and the fourth transistor are simultaneously turned on in an initialization period.

* * * * *